US010562289B2

(12) United States Patent
Skubic et al.

(10) Patent No.: US 10,562,289 B2
(45) Date of Patent: Feb. 18, 2020

(54) PRINT FOUNDATION POSITIONING AND PRINTING METHODS FOR ADDITIVE MANUFACTURING SYSTEM

(71) Applicant: Stratasys, Inc., Eden Prairie, MN (US)

(72) Inventors: Robert L. Skubic, Chanhassen, MN (US); John Bushey, Eden Prairie, MN (US); Chad E. Beery, Waconia, MN (US); Michael D. Bosveld, Bloomington, MN (US); Robert E. Styer, Apple Valley, MN (US)

(73) Assignee: STRATASYS, INC., Eden Prairie, MN (US)

( * ) Notice: Subject to any disclaimer, the term of this patent is extended or adjusted under 35 U.S.C. 154(b) by 277 days.

(21) Appl. No.: 15/339,583

(22) Filed: Oct. 31, 2016

(65) Prior Publication Data

US 2017/0120522 A1    May 4, 2017

Related U.S. Application Data

(60) Provisional application No. 62/248,982, filed on Oct. 30, 2015.

(51) Int. Cl.
*B33Y 10/00* (2015.01)
*B33Y 40/00* (2015.01)
(Continued)

(52) U.S. Cl.
CPC .............. *B33Y 50/02* (2014.12); *B29C 48/21* (2019.02); *B29C 64/118* (2017.08); *B33Y 10/00* (2014.12); *B33Y 30/00* (2014.12); *B33Y 40/00* (2014.12)

(58) Field of Classification Search
CPC ....... B26C 64/227; B33Y 30/00; B33Y 10/00; B33Y 50/02; B33Y 40/00; B29C 48/21;
(Continued)

(56) References Cited

U.S. PATENT DOCUMENTS 5,503,785 A    4/1996  Crump et al.
5,594,652 A  *  1/1997  Penn .................... H05K 3/125
                                                    345/419
(Continued)

FOREIGN PATENT DOCUMENTS

CA          1298689        4/1992
JP       01294024 A  * 11/1989  ......... B29C 45/1761

OTHER PUBLICATIONS

Espacenet translation of JP 01294024 A, Nov. 28, 1989 (Year: 1989).*

*Primary Examiner* — Anthony Calandra
*Assistant Examiner* — Caroline Montiel
(74) *Attorney, Agent, or Firm* — Westman, Champlin & Koehler, P.A.

(57) ABSTRACT

Method for printing a three-dimensional part layerwise with an additive manufacturing system includes printing layers by depositing material from a print head onto a print foundation, incrementing a position of the print head relative to the print foundation after each layer is printed, and indexing the print foundation carrying the printed layers away from the print head along the printing axis after a number of layers are printed. Printing is performed with driven and fixed rails clamped against movement of the print foundation. Moving the print foundation includes moving the driven rails with respect to the fixed rails in a direction substantially perpendicular to the build plane. Additive manufacturing system includes a drive mechanism to index the print foundation on the printing axis using fixed and driven rails, the driven rails engaging the print foundation for moving the print foundation.

20 Claims, 26 Drawing Sheets

(51) Int. Cl.
  *B29C 64/118* (2017.01)
  *B29C 48/21* (2019.01)
  *B33Y 50/02* (2015.01)
  *B33Y 30/00* (2015.01)

(58) Field of Classification Search
  CPC ..... B29C 48/02; B29C 64/118; B29C 64/245; B29C 64/379
  See application file for complete search history.

(56) References Cited

U.S. PATENT DOCUMENTS

| | | | |
|---|---|---|---|
| 5,793,389 A * | 8/1998 | Mitchell | B41J 2/16523 347/22 |
| 5,866,058 A | 2/1999 | Batchelder et al. | |
| 6,004,124 A | 12/1999 | Swanson et al. | |
| 6,070,107 A | 5/2000 | Lombardi et al. | |
| 6,228,923 B1 | 5/2001 | Lombardi et al. | |
| 6,243,616 B1 * | 6/2001 | Droscher | B33Y 70/00 700/118 |
| 6,722,872 B1 | 4/2004 | Swanson et al. | |
| 6,790,403 B1 | 9/2004 | Priedeman, Jr. et al. | |
| 6,923,634 B2 | 8/2005 | Swanson et al. | |
| 7,122,246 B2 | 10/2006 | Comb et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,744,364 B2 | 6/2010 | Turley et al. | |
| 7,896,209 B2 | 3/2011 | Batchelder et al. | |
| 7,938,351 B2 | 5/2011 | Taatjes et al. | |
| 7,938,356 B2 | 5/2011 | Taatjes et al. | |
| 8,153,182 B2 | 4/2012 | Comb et al. | |
| 8,955,558 B2 | 2/2015 | Bosveld et al. | |
| 2008/0241404 A1 * | 10/2008 | Allaman | B29C 64/165 427/333 |
| 2009/0263582 A1 | 10/2009 | Batchelder | |
| 2010/0096072 A1 | 4/2010 | Hopkins et al. | |
| 2010/0283172 A1 | 11/2010 | Swanson | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2012/0046779 A1 * | 2/2012 | Pax | B29C 64/106 700/112 |
| 2012/0164256 A1 | 6/2012 | Swanson et al. | |
| 2013/0078073 A1 | 3/2013 | Comb et al. | |
| 2013/0161432 A1 | 6/2013 | Mannella et al. | |
| 2013/0161442 A1 | 6/2013 | Mannella et al. | |
| 2014/0039659 A1 * | 2/2014 | Boyer | B33Y 10/00 700/98 |
| 2014/0048971 A1 | 2/2014 | Mannella et al. | |
| 2014/0048980 A1 * | 2/2014 | Crump | B33Y 10/00 264/401 |
| 2014/0048981 A1 | 2/2014 | Crump et al. | |
| 2014/0052287 A1 | 2/2014 | Swanson et al. | |
| 2014/0252684 A1 * | 9/2014 | Swanson | B29C 67/0055 264/401 |
| 2015/0174828 A1 * | 6/2015 | Creuzer | B29C 64/386 264/40.1 |
| 2015/0224718 A1 * | 8/2015 | Ederer | B29C 64/20 264/308 |

* cited by examiner

PRINT FOUNDATION POSITIONING AND PRINTING METHODS FOR ADDITIVE MANUFACTURING SYSTEM

CROSS-REFERENCE TO RELATED APPLICATION(S)

The present application claims the benefit of U.S. Provisional Patent Application Ser. No. 62/248,982, entitled "PRINT FOUNDATION POSITIONING AND PRINTING METHODS FOR ADDITIVE MANUFACTURING SYSTEM" filed on Oct. 30, 2015, the contents of which are incorporated herein by reference in its entirety. Reference is also hereby made to co-filed U.S. Patent Application Ser. No. 62/248,990, entitled "STARTER PIECE AND PRINTING METHODS FOR ADDITIVE MANUFACTURING SYSTEM" and U.S. Patent Application Ser. No. 62/248,994, entitled "PROBE AND PRINTING METHODS FOR ADDITIVE MANUFACTURING SYSTEM". Each of the patent applications and patents discussed herein is hereby incorporated by reference in its entirety.

BACKGROUND

The present disclosure relates to additive manufacturing systems for building three-dimensional (3D) items with layer-based, additive manufacturing techniques. In particular, the present disclosure relates to additive manufacturing systems for printing large or elongated 3D items, and methods for printing 3D items in the additive manufacturing systems.

Additive manufacturing systems are used to print or otherwise build 3D items from digital representations of the 3D items (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D item is initially sliced into multiple horizontal layers. For each sliced layer, one or more tool paths are then generated, which provides instructions for the particular additive manufacturing system to print the given layer.

For example, in an extrusion-based additive manufacturing system, a 3D item may be printed from a digital representation of the 3D item in a layer-by-layer manner by extruding a flowable item material. The item material is extruded through an extrusion tip or nozzle carried by a print head of the system, and is deposited as a sequence of roads on a substrate in an x-y plane while the print head moves along the tool paths. The extruded item material fuses to previously deposited item material, and solidifies upon a drop in temperature. The position of the print head relative to the substrate is then incremented along a z-axis (perpendicular to the x-y plane), and the process is then repeated to form a 3D item resembling the digital representation.

In fabricating 3D items by depositing layers of an item material, supporting layers or structures are typically built underneath overhanging portions or in cavities of 3D items under construction, which are not supported by the item material itself. A support structure may be built utilizing the same deposition techniques by which the item material is deposited. The host computer generates additional geometry acting as a support structure for the overhanging or free-space segments of the 3D item being formed. Support material is then deposited from a second nozzle pursuant to the generated geometry during the printing process. The support material adheres to the item material during fabrication, and is removable from the completed 3D item when the printing process is complete.

SUMMARY

An aspect of the present disclosure is directed to a layerwise method for printing a three-dimensional part with an additive manufacturing system. The method includes printing a plurality of layers of the three-dimensional item by depositing material from a print head onto a print foundation of the additive manufacturing system, incrementing a position of the print head relative to the print foundation after each layer is printed, and indexing the print foundation carrying the layers away from the print head along the printing axis after printing a plurality of layers of the three-dimensional item in a direction substantially perpendicular to the build plane. Printing is performed in one aspect with a plurality of driven and fixed rails configured to clamp the three-dimensional item against movement independent of the print foundation. Moving the print foundation includes moving the driven rails with respect to the fixed rails in the direction substantially perpendicular to the build plane.

Another aspect of the present disclosure is directed to an additive manufacturing system including a print foundation, and a drive mechanism configured to index the print foundation along a printing axis, the drive mechanism comprising a gantry having a frame with a plurality of support rails and a drive system configured to move the print foundation along the gantry. The drive system further includes a rail system having a plurality of fixed rails and a plurality of driven rails, the driven rails configured to engage the print foundation for moving the print foundation.

Another aspect of the present disclosure is directed to a method for printing a three-dimensional item with an additive manufacturing system. The method includes supplying a starter piece and a print foundation for printing of the three-dimensional item, printing a plurality of layers of a support structure on the starter piece and a plurality of layers of the three-dimensional item on the print foundation, and indexing the print foundation along a gantry with a drive mechanism, wherein printing is performed with a plurality of driven and fixed rails each having a clamp releasably clampable to the three-dimensional item, and wherein indexing the print foundation includes moving the driven rails with respect to the fixed rails after a plurality of layers are printed.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

The term "printing onto", such as for "printing a 3D item onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D item onto a print foundation may include (i) a situation in which the 3D item is directly printed onto to the print foundation, (ii) a situation in which the 3D item is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "item" includes, by way of example only and not by limitation, standalone printed structures or parts that are utilized in combination with other parts to form a desired structure.

DETAILED DESCRIPTION

Figure 1:
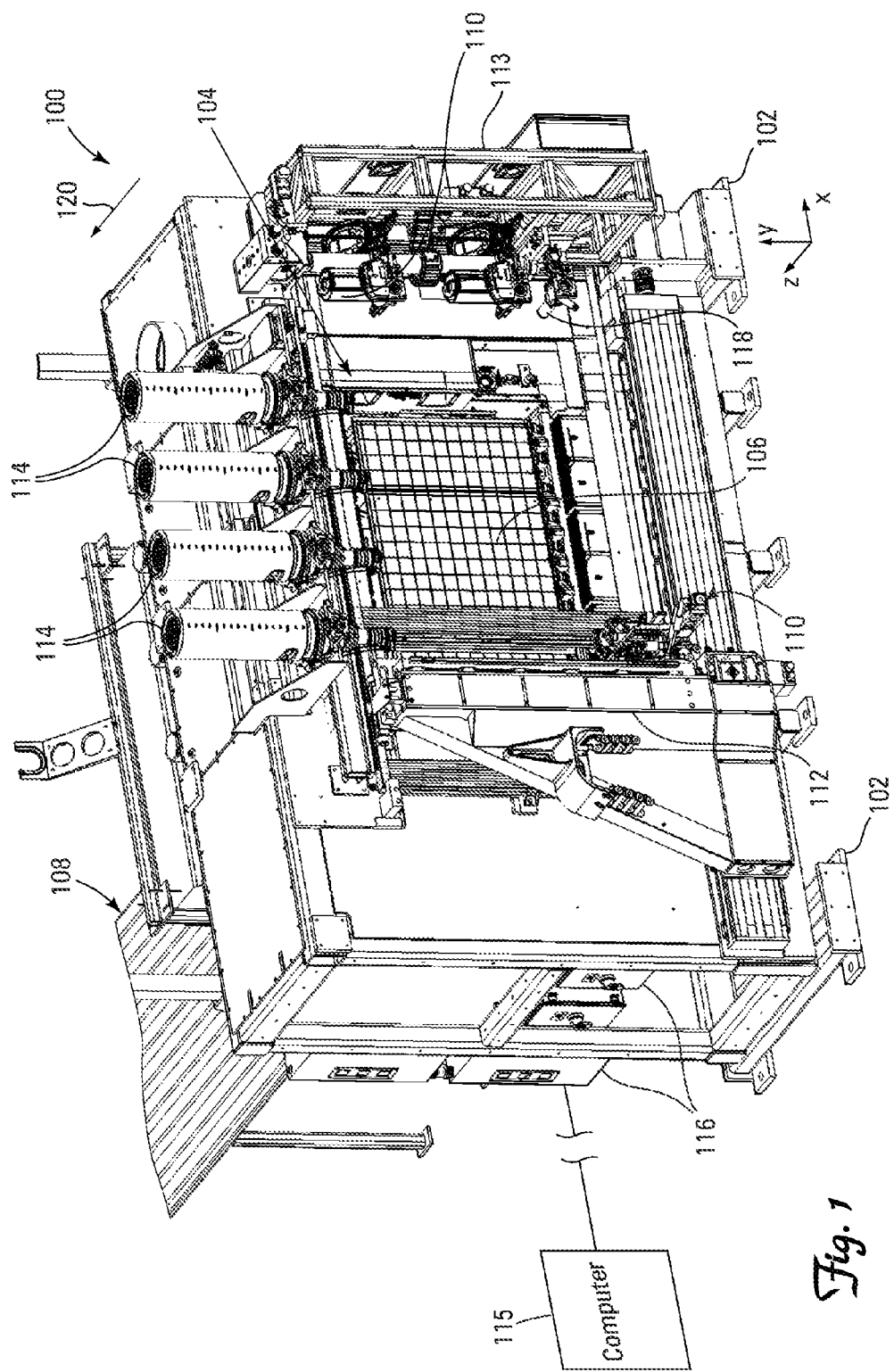
FIG. 1 is a perspective view of a portion of an additive manufacturing system according to an embodiment of the present disclosure.

The present disclosure is directed to an additive manufacturing system having an extended printing volume for printing long or tall 3D items. The additive manufacturing system includes a drive system for indexing a print foundation along a gantry or other support as the item is being printed. The additive manufacturing system includes in one embodiment a heated chamber having a port that opens the chamber to ambient conditions outside of the chamber. The system also includes one or more print heads configured to print a 3D item in a layer-by-layer manner onto a print foundation (e.g., a platen or other component having a receiving surface, which may be a build sheet fixed on a vacuum platen) in the heated chamber. As the printed 3D item grows on the print foundation, the print foundation may be indexed or otherwise moved through the port by the drive system in a coarse indexing adjustment. The print head may also be indexed to the layers of the three-dimensional item in a fine indexing adjustment. The printed 3D item may continue to grow out of the port until a desired length or height is achieved. The use of the port expands the printable volume along a printing axis of the system, allowing long or tall 3D items, such as airfoils, manifolds, fuselages, and the like to be printed in a single printing operation. As such, the 3D items may be larger than the dimensions of the additive manufacturing system, for example items having a length greater than a length of the build chamber.

The present disclosure is further directed to a touch probe for use with an additive manufacturing system having an extended printing volume for printing long or tall 3D items, methods for printing and for operating the additive manufacturing system with the touch probe, and methods for printing and operating the additive manufacturing system with starter pieces and a drive system. The touch probe can operate in three dimensions.

As discussed further below, the additive manufacturing system may be configured to print 3D items in a horizontal direction, a vertical direction, or along other orientations (e.g., slopes relative to the horizontal and vertical directions). In each of these embodiments, the layers of a printed 3D item may be stabilized by one or more printed supports or "scaffolds", which brace the 3D item laterally relative to the printing axis of the system to address forces parallel to the build plane. The supports in horizontal printing act as a printed support structure.

In printing horizontally in a layer-by-layer manner from a print head nozzle, the layers of a 3D item being printed grow horizontally along the z-axis. As such, the "printing axis" in FIGS. 1-12 is a horizontal z-axis axis, and each layer extends parallel to a vertical x-y build plane.

In this situation, the layers of 3D item are printed on layers of support structure that extend from the starter pieces as described herein, to support the item weight to the support rails also described herein, which are correspondingly disposed on a platen.

For a horizontal printing operation, such as shown in FIGS. 1-12, the printing z-axis is a horizontal axis, and each layer of the 3D item and its support structure extend along the vertical x-y build plane. In further alternative embodiments, the layers of 3D items, support structures, and scaffolds may be grown along any suitable axis.

Horizontal Printing

FIGS. 1-12 illustrate example additive manufacturing systems of the present disclosure having extended printing volumes for printing long 3D items horizontally, such as discussed above for a 3D item. FIGS. 1-5 illustrate system 100, which is a first exemplary manufacturing system for printing or otherwise building 3D items, support structures, and/or scaffolds horizontally using a layer-based, additive manufacturing technique. Suitable systems for system 100 include extrusion-based additive manufacturing systems developed by Stratasys, Inc., Eden Prairie, Minn. under the trademark "FDM", which are oriented such that the printing z-axis is a horizontal axis. In horizontal printing, the print axis is parallel to the print plane, and movement is perpendicular to the print plane.

As shown in FIG. 1, system 100 may rest on a table or other suitable surface 102, and includes chamber 104, platen 106, platen gantry 108, print head 110, head gantry 112, tool changer 113, and consumable assemblies 114. Chamber 104 is in one embodiment enclosed by chamber walls, and initially contains platen 106 for printing 3D items, support structures, and/or scaffolds. Support structures and scaffolds are described in further detail in co-pending application Publication No. 2014/0052287.

In the shown embodiment, chamber 104 includes a heating mechanism, which may be any suitable mechanism configured to heat chamber 104, such as one or more heaters and air circulators to blow heated air throughout chamber 104. Heating mechanism may heat and maintain chamber 104, at least in the vicinity of print head 110, at one or more temperatures that are in a range between the solidification temperature and the creep relaxation temperature of the item material and/or the support material. This reduces the rate at which the item and support materials solidify after being extruded and deposited (e.g., to reduce distortions and curling), where the creep relaxation temperature of a material is proportional to its glass transition temperature. Examples of suitable techniques for determining the creep relaxation temperatures of the item and support materials are disclosed in Batchelder et al., U.S. Pat. No. 5,866,058.

Chamber walls may be any suitable barrier to reduce the loss of the heated air from the build environment within chamber 104, and may also thermally insulate chamber 104.

In some embodiments, system 100 may be configured to actively reduce heat loss through a port in the chamber 104, such as with an air curtain, thereby improving energy conservation. Furthermore, system 100 may also include one or more permeable barriers at the port, such as insulating curtain strips, a cloth or flexible lining, bristles, and the like, which restrict air flow out of the port, while allowing platen 106 to pass therethrough.

In the shown example, print head 110 is a dual-tip extrusion head configured to receive consumable filaments or other materials from consumable assemblies 114 for printing a 3D item, support structure, and scaffold onto a receiving surface of platen 106. Examples of suitable devices for print head 110 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182.

In additional embodiments, in which print head 110 is an interchangeable, single-nozzle print head, a plurality of additional print heads 110 may be stored, for example within tool changer 113 as shown in FIG. 1, and may be interchangeably used for different printing functions. In one embodiment, tool changer 113 holds up to three separate print heads. Examples of suitable devices for each print head 110, and the connections between print head 110 and head gantry 112 include those disclosed in Swanson et al., U.S. Patent Application Publication No. 2012/0164256.

Print head 110 is supported by head gantry 112, which is a gantry assembly configured to move print head 110 in (or substantially in) the x-y plane parallel to platen 106. While the additive manufacturing systems discussed herein are illustrated as printing in a Cartesian coordinate system, the systems may alternatively operate in a variety of different coordinate systems. For example, head gantry 112 may move print head 110 in a polar coordinate system, providing a cylindrical coordinate system for system 100.

Suitable devices for consumable assemblies 114 include those disclosed in Swanson et al., U.S. Pat. No. 6,923,634; Comb et al., U.S. Pat. No. 7,122,246; Taatjes et al, U.S. Pat. Nos. 7,938,351 and 7,938,356; Swanson, U.S. Patent Application Publication No. 2010/0283172; and Mannella et al., U.S. patent application Ser. Nos. 13/334,910 and 13/334,921.

Suitable materials and filaments for use with print head 110 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233 1164; and Hopkins et al., U.S. Patent Application Publication No. 2010/0096072. Examples of suitable average diameters for the filaments range from about 1.02 millimeters (about 0.040 inches) to about 3.0 millimeters (about 0.120 inches). Further in some embodiments, pellets of material are used as consumable feed stock. In such embodiments, a viscosity pump using a pellet-fed screw extruder may be used. Particle materials are fed to or drawn by the viscosity pump from particle hoppers (e.g., consumable assemblies 114), and are heated and sheared to an extrudable state, and extruded from a nozzle of the viscosity pump, as described in greater detail in U.S. Patent Application Publication No. 2014/0048981 and U.S. Pat. No. 8,955,558.

System 100 also includes in one embodiment controller 116, which is one or more control circuits configured to monitor and operate the components of system 100. For example, one or more of the control functions performed by controller 116 can be implemented in hardware, software, firmware, and the like, or a combination thereof. Controller 116 may communicate with chamber 104 (including any heating mechanism), print head 110, motor (not shown), and various sensors, calibration devices, display devices, and/or user input devices over suitable communication lines.

In some embodiments, controller 116 may also communicate with one or more of platen 106, platen gantry 108, head gantry 112, and any other suitable component of system 100. While illustrated as a single signal line, communication lines may include one or more electrical, optical, and/or wireless signal lines, allowing controller 116 to communicate with various components of system 100. Furthermore, while illustrated outside of system 100, controller 116 and communication lines can be internal components to system 100.

System 100 may also communicate with a computer 115 located with system 100 or remote therefrom, which may be one or more computer-based systems that communicate with system 100 and/or controller 116, and may be separate from system 100, or alternatively may be an internal component of system 100. Computer 115 includes computer-based hardware, such as data storage devices, processors, memory modules and the like for generating and storing tool path and related printing instructions. The computer 115 may transmit these instructions to system 100 (e.g., to controller 116) to perform printing operations.

During operation, controller 116 may direct print head 110 to selectively draw successive segments of the item and support material filaments from consumable assemblies 114. Print head 110 thermally melts the successive segments of the received filaments such that they become molten flowable materials. The molten flowable materials are then extruded and deposited from print head 110, along the printing z-axis axis, onto the receiving surface for printing the 3D item (from the item material), support structure (from the support material), and scaffold (from the item and/or support materials).

Print head 110 may initially print one or more layers of support structure onto receiving surface to provide a base for the subsequent printing. This maintains good adhesion between the layers of a 3D item and a build sheet, and reduces or eliminates any tolerance to flatness between the receiving surface of the platen 106 and the x-y plane.

After the support structure is initially printed, print head 110 may then print layers of the 3D item and scaffold, and optionally any additional layers of support structure. The layers of support structure are intended to support the bottom surfaces of the 3D item along the printing z-axis against curl forces, and any support layers are intended to brace the 3D item against gravity along the vertical x-axis. Printing is performed in this embodiment in a Z-direction indicated by arrow 120. X-Y-Z orientation indications are provided in FIGS. 1-4.

As layers of the item are printed in the horizontal direction, the print head 110 moves along print roads to build the item. In some embodiments, the print head 110 has enough variability in position to allow for the printing of a number of layers (in one embodiment on the order of one hundred (100) layers) before movement of the item is performed. Printing multiple layers without moving the item in one embodiment is performed because as the item is built, the weight of the item increases with each layer of the item built. On a system such as system 100, in which the length/size of the item is undetermined and can be quite large, an item can weigh several hundred pounds or more. Indexing to an item of such size and weight is difficult since moving an item of such size and weight is not as precise as the resolution to which the item is being printed. Accuracy of movement of, for example, a print head such as print head 110, is much higher. Therefore, accuracy of position of a smaller component can be much higher than accuracy in positioning the larger item.

To ensure sufficient position accuracy, a touch probe 118 is used in one embodiment to assist in registration for the printing of layers of an item being printed. Touch probe 118 is in one embodiment a plunger that is used to accurately determine a current Z-position so that a printing tip of a print head may be positioned to within a resolution on the order of one tenth the resolution of the print head. For example, with a printing resolution of on the order of 0.001-0.003 inches, the plunger 118 determines a current Z-position of the item being printed to 0.0001 inches, approximately ten times finer than the resolution of the print head. As print operations are typically performed within a heated chamber, thermal expansion of components such as the touch probe 118 can be significant. With temperatures in the chamber 104 running on the order of ~350° F. (~180° C.), thermal expansion on a component such as touch probe 118 could easily be on the order of 0.001 inches or more, rendering the resolution of the touch probe moot compared to the print resolution. In one embodiment, the touch probe components, especially the components that comprise the plunger portion of the touch probe, are specialized materials with low coefficients of thermal expansion, such as Invar®, a nickel-iron alloy. Further, as is described in further detail below, the temperature of the touch probe is on one embodiment maintained at or below about 212° F. (100° C.).

Movement of a large and/or heavy item is accomplished on one embodiment with a plurality of rails and drivers, such as are shown and described in further detail in FIGS. 2-8. Referring now to FIGS. 2-8, the gantry 108 is described in greater detail. With items that are printed horizontally, such as with a system 100 as described herein, a gantry such as gantry 108 is used to assist in supporting the item as it is printed and moved to allow further printing by the print head 110. Components of the gantry 108 and platen 106 assist in moving the item when it is desired to move the item.

Figure 24:
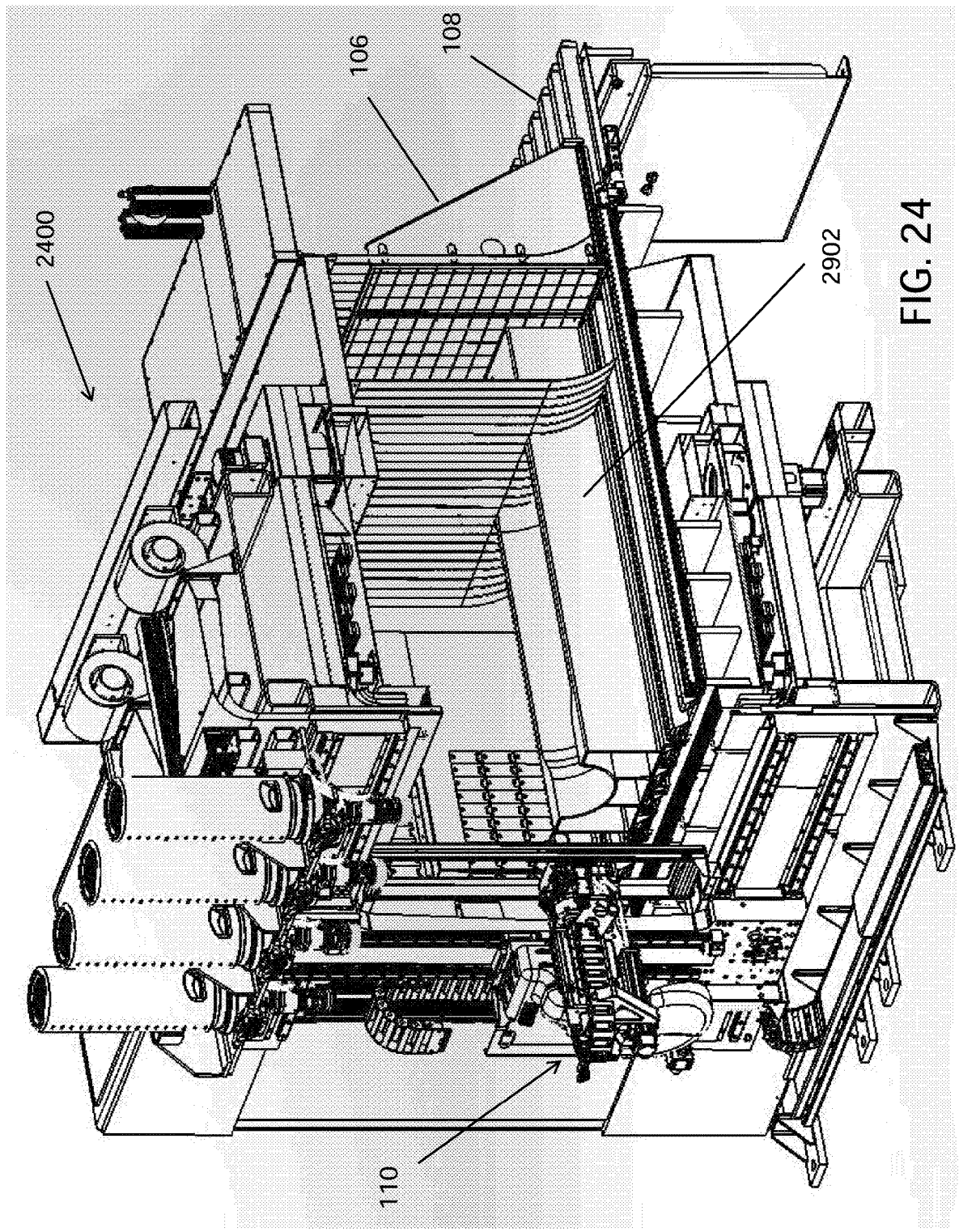
FIG. 24 is a perspective view of a portion of an additive manufacturing system according to another embodiment of the present disclosure.

As a horizontally oriented item may be much longer than the chamber or machine which is printing it, the item is eventually moved beyond the heated chamber. In a horizontally printed item, embodiments of the present disclosure move the item on the gantry 108 in a direction perpendicular to the printing plane. The platen 106 may be removed and set aside when a part, such as elongated part 2902 shown in FIG. 24 is being printed with system 2900, to a length extending beyond the extent of the gantry 108. In one embodiment, after removal of the platen 106, the part 2902 is supported by a platform or table 2904 that is at the same height as the gantry 108 but allows extension of the elongated part 2902 beyond the gantry 108. The platform or table 2904 may be used to provide support for a part 2902 having a length greater than the gantry 108. The size of the table or platform 2904 may be selected depending upon the length to which the part 2902 is to be printed. It should also be understood that additional tables or platforms 2904 may be used to extend the support for the elongated part 2902 even further, without departing from the scope of the disclosure. FIG. 24 shows a system 2900 wherein a support table 2904 is used to support elongated part 2902 that extends past the gantry 108. In this embodiment, platen 106 is removed and set aside, in one embodiment on a separate table 2906.

Figure 25:
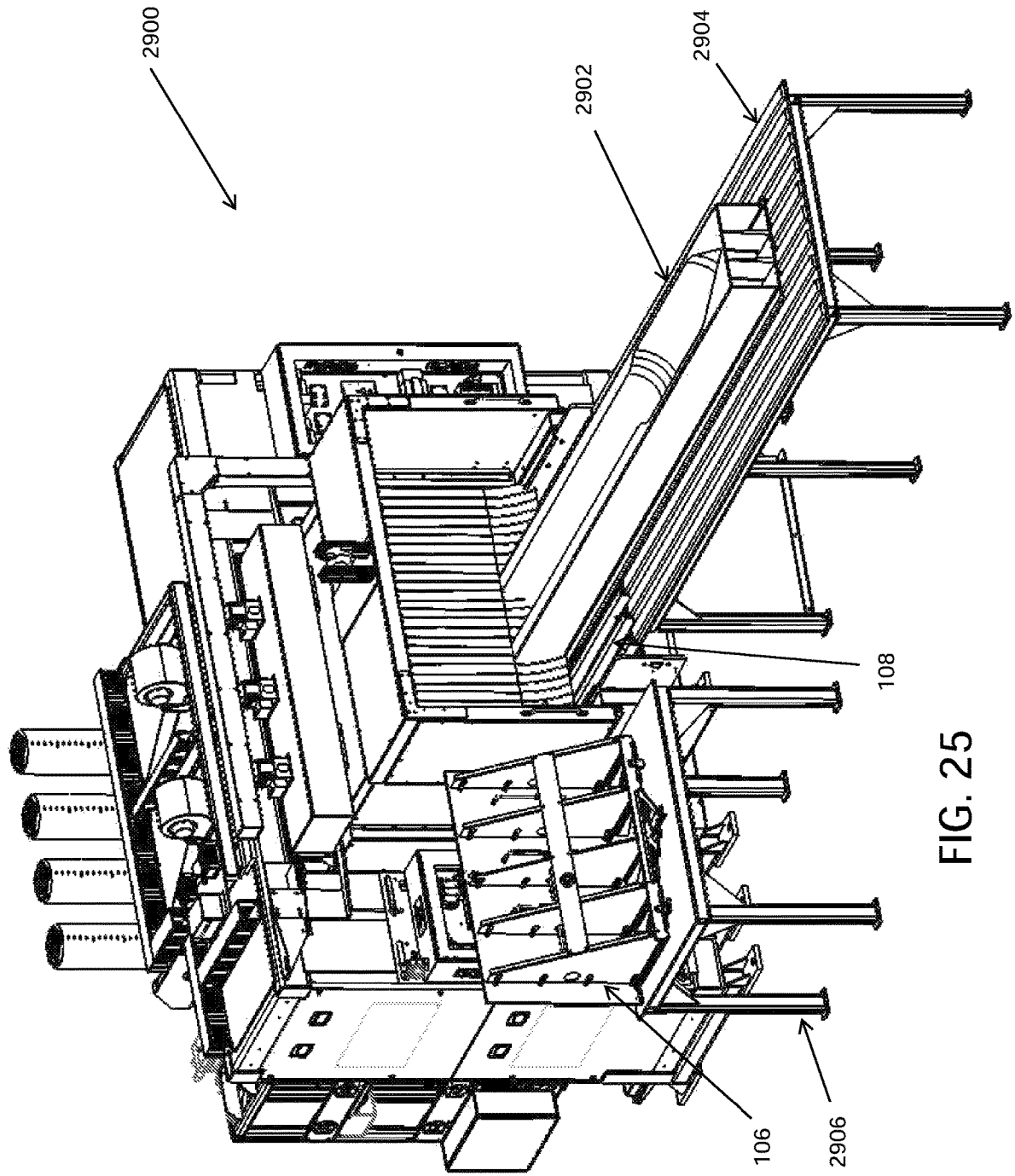
FIG. 25 is a perspective view of the additive manufacturing system of claim 29 with a print foundation removed.
Figure 26:
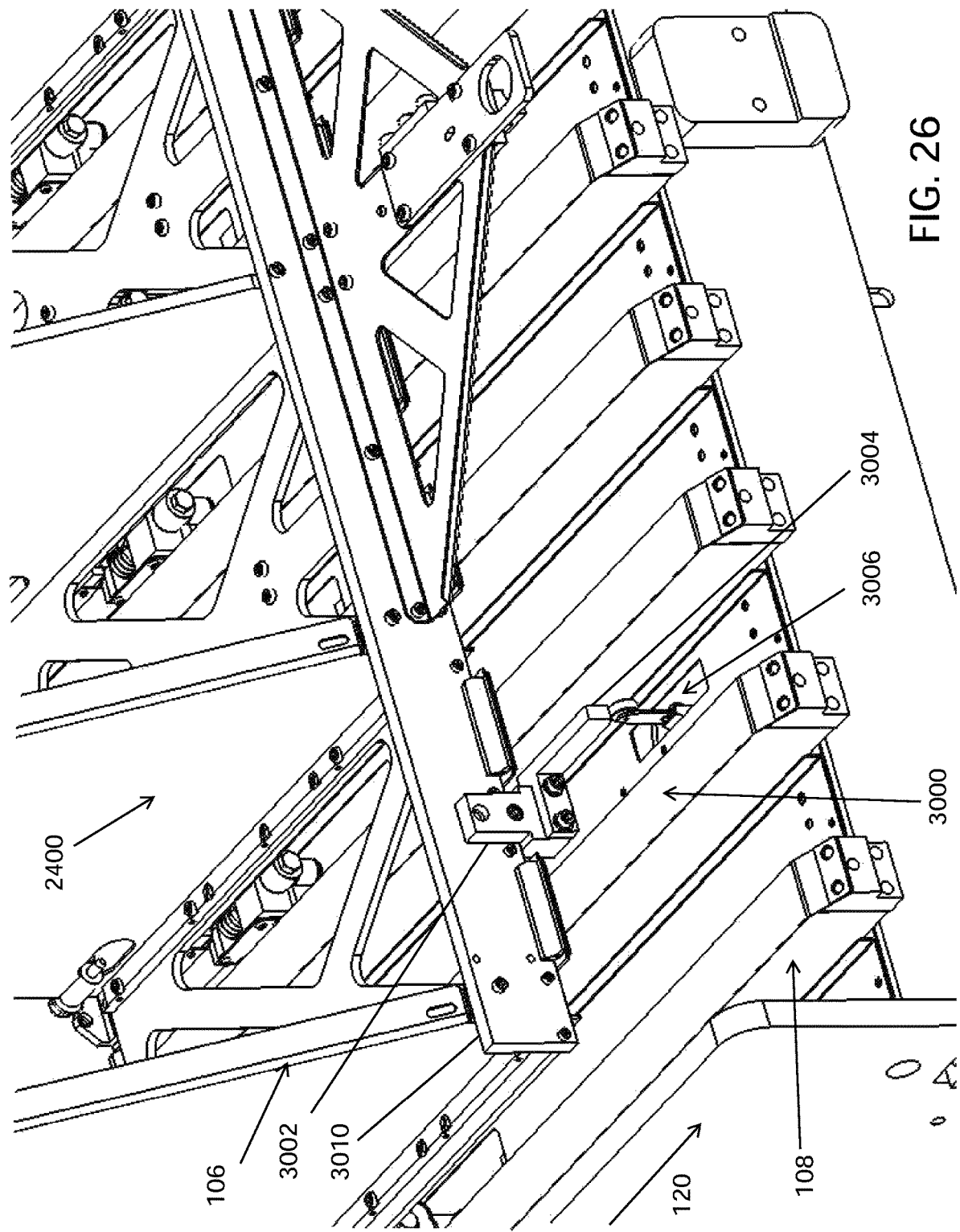
FIG. 26 is a close-up perspective view of a portion of an additive manufacturing system with a limit switch assembly according to another embodiment of the present disclosure.

FIG. 25 is a close-up view of the system 2900 with the platen 106 in a position in which it nears the end of the gantry 108. In this embodiment, as the platen 106 to which the three-dimensional item 2902 is secured approaches the end of the gantry 108, a limit switch system 3000 is engaged to stop further advancement of the platen 106 on the gantry 108. Limit switch system 3000 in one embodiment comprises a block 3002 secured to the platen 106, such as on a cross brace 3010 of the platen 106. Block 3002 carries or is attached to a contact arm 3004 that extends in one embodiment in an axis parallel to a direction of movement of the platen 106 on the gantry 108 away from the print head, as indicated by arrow 120. As the platen 106 approaches the end of the gantry 108, the contact arm contacts limit switch 3006, and the limit switch system 3000 instructs a controller or computer (such as controller 116 or computer 115) to stop motion of the platen. Limit switch system 3000 is shown as using a mechanical limit switch 3006. It should be understood that different types of switches, for example electrical switches, electromagnetic switches, and the like, could be used with limit switch system 3000 without departing from the scope of the disclosure.

Once limit switch system 3000 halts motion of the platen 106 as it nears the end of the gantry 108, the three-dimensional item, which is releasably secured to the platen 106, is released from the platen 106, the platen 106 is pulled away from the three-dimensional item, and removed. In one embodiment, the platen 106 is removed to a separate table such as table 2906 as shown in FIG. 24. Then, a support table, such as table 2904, is placed at the end of the gantry 108, and printing of the three-dimensional item continues without the platen 106. In this embodiment, the starter piece or pieces (e.g., 900 and/or 1200), that provide a base for the building of the three-dimensional item as described herein with respect to FIGS. 9-13, support the three-dimensional item. In one embodiment, the print foundation is releasably secured to the three-dimensional item, and the starter piece or pieces support the three-dimensional item when the print foundation is released from the three-dimensional item. Releasing the three-dimensional item from the print foundation (e.g., platen 106) is done in one embodiment when the three-dimensional item is indexed to near an end of the gantry 108.

While a platen 106 has been described herein in which a build sheet is fixed on the platen 106 or other component having a receiving surface, which may be a build sheet fixed on the platen 106 and held there with a vacuum, it should be understood that other releasably securable mechanisms for holding the three-dimensional item to the platen are amenable with the embodiments of the removable platen as described herein. By way of example only and not by limitation, such mechanisms include mechanical attachments (e.g., clamps, cams, or the like), magnetic attachments, electro-magnetic attachments, and the like.

As print resolutions become increasingly fine, a number of layers may be printed on an item before it is moved on the gantry 108. In 3D printing, there is a significant amount of movement of a print head along roads, and between roads. With the amount of movement of the print head in a printing operation, speed of movement of the print head, and also the printed item, becomes a factor. The speed and accuracy with which a smaller, lighter print head may be moved is higher than the speed and accuracy of movement of a large and heavy item. Moving a lighter weight component such as the print head is faster than moving a heavier item, which is a consideration in any manufacturing process. In embodiments of the present disclosure, multiple layers of an item are printed before any movement of the item. In one embodiment, the number of layers printed before moving the item is one hundred (100). All moves within the about one hundred (100) layers between movement of the item are performed by movement of the print head. Once about one hundred (100) layers have been printed, the item is moved. Although about one hundred (100) layers is discussed between movement of the item, it should be understood that a larger or smaller number of layers may be printed before movement of the item, and that the number of layers between item movements may be variable and depend on any number of factors including manufacturing conditions, print materials, the geometry of the item itself, and the like.

Figure 2:
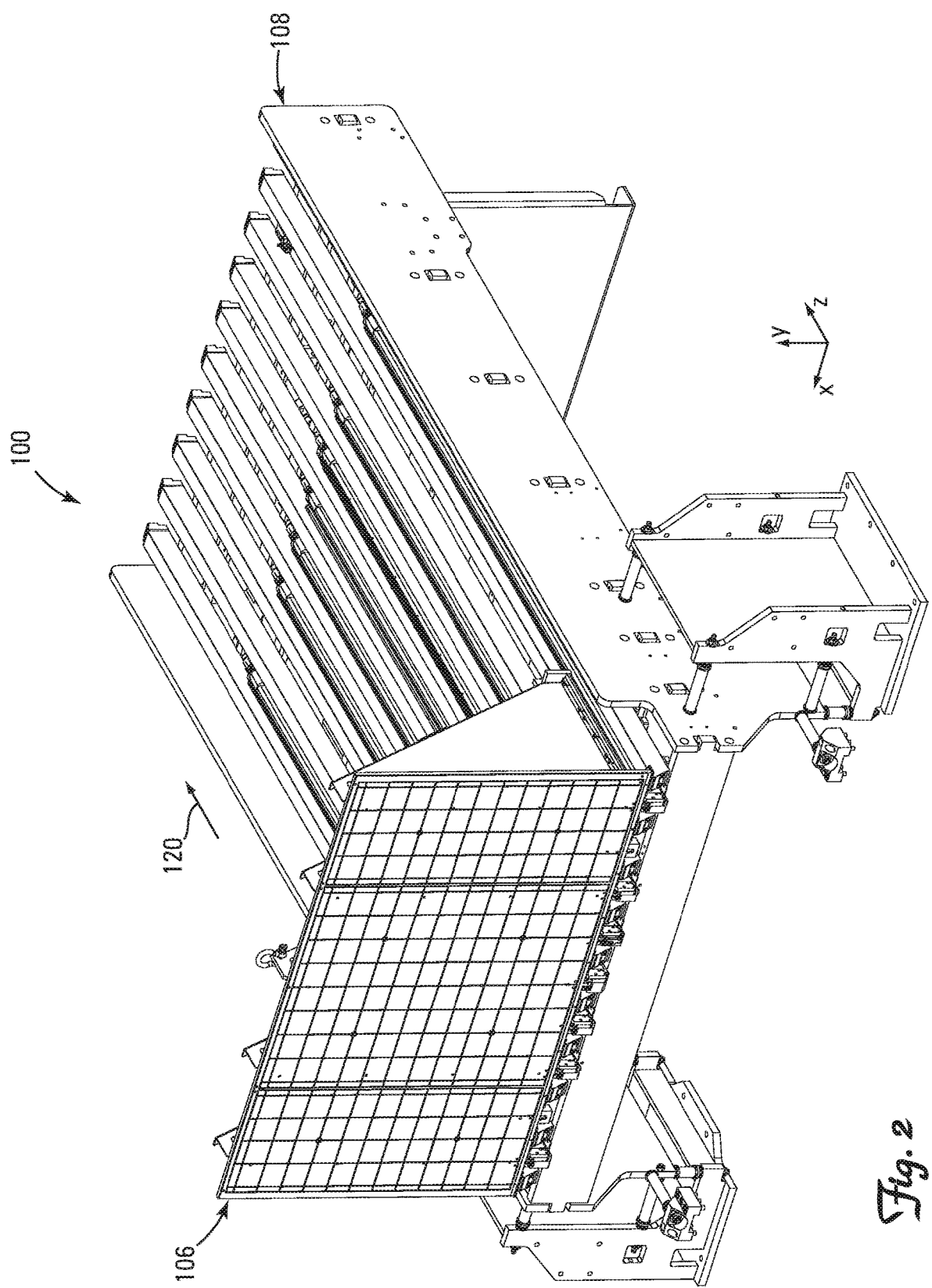
FIG. 2 is a perspective view of a platen and gantry portion of the additive manufacturing system of FIG. 1.

For example, in one embodiment, the horizontally printed item is moved on the gantry along a series of rails, using clamps and cylinders to adjust its position before the printing of additional layers of the item. FIG. 2 illustrates generally a configuration of system 100 including platen 106 and gantry 108. Platen 106 is movable along the gantry 108 in the direction of the Z-axis. Movement of the platen 106 along gantry 108 is performed in one embodiment as shown in FIGS. 3-8.

Figure 3:
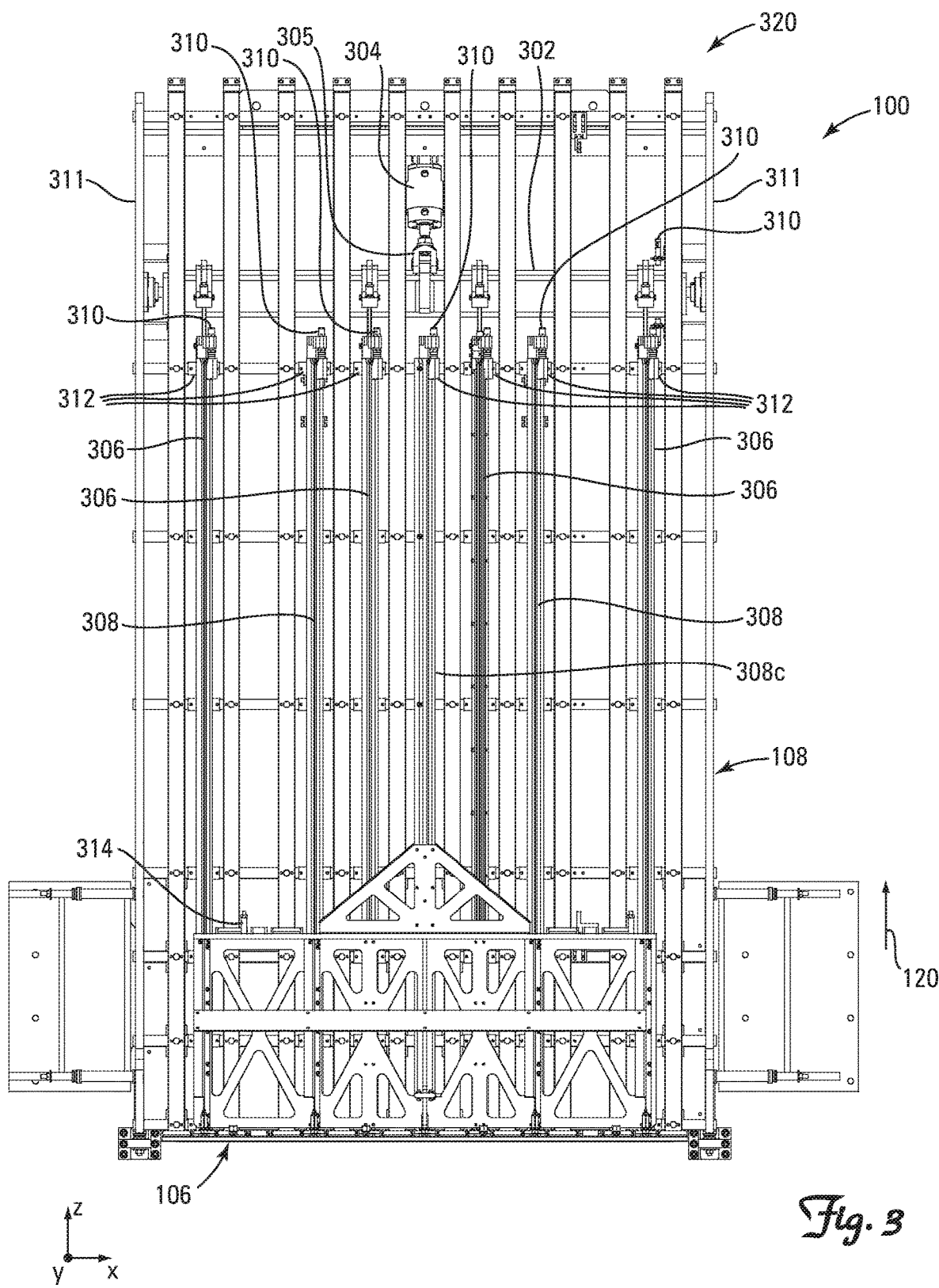
FIG. 3 is a top view of FIG. 2.
Figure 6:
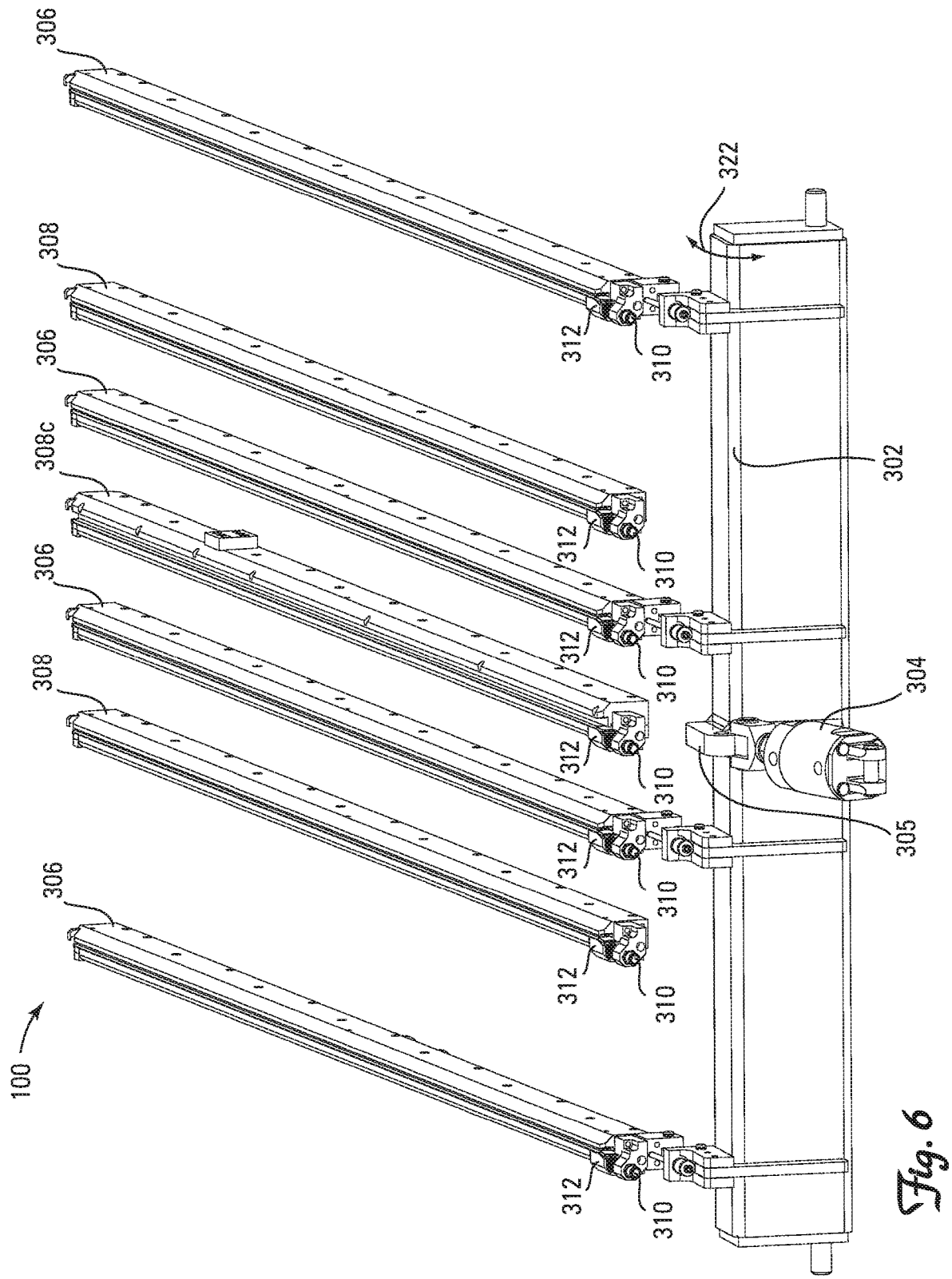
FIG. 6 is a perspective view of a drive system for an additive manufacturing system according to another embodiment of the present disclosure.

FIG. 3 is a top view of the system 100, showing platen 106, gantry 108, a torque tube 302, torque tube cylinder 304, and a series of driven rails 306, fixed rails 308, cylinders 304, 310, and clamps 305, 312, that work together in one embodiment to move an item being printed with system 100 along gantry 108. The clamps 305, 312 are in one embodiment linear pneumatic clamps that are positioned within the rails such that the clamps may releasably engage a three-dimensional item being printed with the system 100. Torque tube 302 is a tube or rod that is rotatably connected to the frame of the gantry 108, in one embodiment to edge rails 311 of the gantry 108, so as to be rotatable along an axis perpendicular to the edge rails 311. Torque tube cylinder 304 is connected to torque tube 302 to drive the torque tube 302 rotatably toward the cylinder 304 and rotatably away from the cylinder 304, when the cylinder 304 extends and retracts, respectively. The cylinder 304 is secured to the torque tube 302 with a mounting bracket or a pin. Torque tube is therefore rotatable between a first position in which it is rotated away from torque cylinder 304 and a second position in which it is rotated toward the torque cylinder 304, along a rotation indication arrow 322 (FIG. 6).

Driven rails 306 are connected to the torque tube 302. Four driven rails 306 are shown, although it should be understood that more or fewer driven rails 306 may be used without departing from the scope of the disclosure. Each driven rail 306 has a respective mounting bracket and clamp 312, and each clamp 312 is operable to secure a driven rail 306 to the item being printed on the platen 106 to fix the item with respect to the platen 106 and gantry 108, in one embodiment by inflation of a bladder with air cylinder 310 that engages the clamp 312 along a length of the driven rail 306. When a clamp 312 is secured to an item being printed, the item being printed is also secured against relative movement with the platen 106. The clamps in one embodiment are linear pneumatic clamps the extend along a length of an opening in their respective rail.

When it is desired to clamp an item being printed to the platen 106 with a driven rail 306, its air cylinder 310 engages the clamp 312. When the clamp 312 is engaged, the driven rail 306 and the item its clamp engages is fixed against motion relative to the platen 106. Rotation of the torque tube 302 toward the torque tube cylinder 304 when the driven rails 306 are clamped to the item being printed, which is fixed to the build sheet of platen 106 on which it is being printed, moves the driven rails 306 and therefore the platen 106 and its associated item toward the cylinder 304. Rotation of the torque tube 302 away from the torque tube cylinder 304 when the driven rails 306 are clamped to item being printed moves the driven rails and therefore the platen 106 and its associated item away from the cylinder 304. In one embodiment, the torque tube cylinder 304 extends and retracts approximately an inch, allowing for incremental motion of the driven rails 306, item being printed, and platen 106 by approximately the same amount when the driven rails 306 are clamped to the item being printed.

It should be understood that incrementing the platen 106 on the gantry may be in increments of greater than an inch by the use of a different torque tube cylinder length. In one embodiment, the coarse adjustment of the item is on the order of less than one inch to six inches. Further, the distance of the coarse adjustment does not need to be constant for each incrementing move of the platen. That is, depending upon part geometry and build parameters, the increment of motion of the platen 106 may be made at any distance within the range of available motion of the torque tube cylinder 304.

Indexing the part along with the platen 106, or after the platen 106 has been removed, may also be done according to the size of a thermal zone in the build chamber of the system 100, 2400. The increment of motion of the platen 106, or the three-dimensional item after removal from the platen 106, is chosen in one embodiment based on a size of the thermal zone within the build chamber that maintains a temperature of the three-dimensional item within a desired temperature range. That is, a print head (such as print head 110) may build up layers of a three-dimensional item within the desired thermal zone within the build chamber to maintain three-dimensional item temperature within a desired range. Once the print head is outside of the desired thermal zone, the part may be indexed along the gantry 108 or support table 2904 to maintain the printing operation within the desired thermal zone.

While printing in layers has been discussed, it should be understood that printing of a three-dimensional item may be along a non-planar tool path, such as a spiral or the like.

Fixed rails 308 are not connected to the torque tube 302, and therefore do not move as the torque tube 302 is rotated. Each fixed rail 308 also has a mounting bracket and clamp 312 for securing the clamp, and therefore the rail 308, to the item being printed in the same manner as described above with respect to the fixed rails 306. Fixed rail 308 clamps 312 are engaged during an item building operation. A center fixed rail, 308c, serves in one embodiment as an alignment rail. The alignment rail is used in one embodiment to align an item on the platen 106 and gantry 108, as is discussed in greater detail below.

Sequential clamping of clamps 312 and movement of the driven rails 306 allows the movement of an item along the gantry 108 as follows. During an item building operation, that is, when layers are being printed to the item, all clamps 312 of rails 306 and 308 are clamped against motion of the item being printed and therefore the platen 106 relative to gantry 108. To move the platen 106 and therefore an item away from the print head along the gantry, that is, toward an end 320 of the gantry 108 distal to the print head and initial position of platen 106, the clamps 312 of the fixed rails 308 are released. The driven rails 306 remain clamped. The torque tube cylinder 304 is retracted so that the driven rails 306, the platen 106, and the item being built move toward the torque tube cylinder 304 and the second position. In this manner, the item is moved toward the distal end 320 of the gantry 108. When the movement is complete, the clamps of the fixed rails 308 are clamped, and the clamps of the driven rails 306 are released. The torque tube cylinder 304 rotates the torque tube 302 away from the cylinder 304 to the first position, moving the driven rails 306 back to their first positions while the platen 106 and therefore the item being printed do not move. All clamps of rails 306, 308 are again clamped for a build operation, and the process repeats as necessary for moving the item on the gantry 108. The process allows for movement of the platen 106 and the item being built along the gantry to whatever position is desired.

In one embodiment, each clamp 312 comprises a pneumatic clamp that is engaged when a silicon bladder positioned within a slot of its rail is inflated by its respective air cylinder 310. Alternatively, each mounting bracket could be engaged when its silicon bladder is deflated. Further, it should be understood that although pneumatic clamps are disclosed, other clamps or mounting brackets suitable for engaging and disengaging the rails 306 and 308 are suitable for use with the various embodiments, such as electric clamps, mechanical clamps, and combinations thereof, and are within the scope of the disclosure and of one skilled in the art.

In one embodiment, each of the rails other than the center rail 308c has two movable edge portions, so that the rails float in the X direction. Center rail 308c comprises one fixed edge portion, and one movable edge portion. Therefore, the position of the fixed edge portion of center rail 308c is known and unchanging, so that the center rail 308c is fixed in the X direction.

Figure 4:
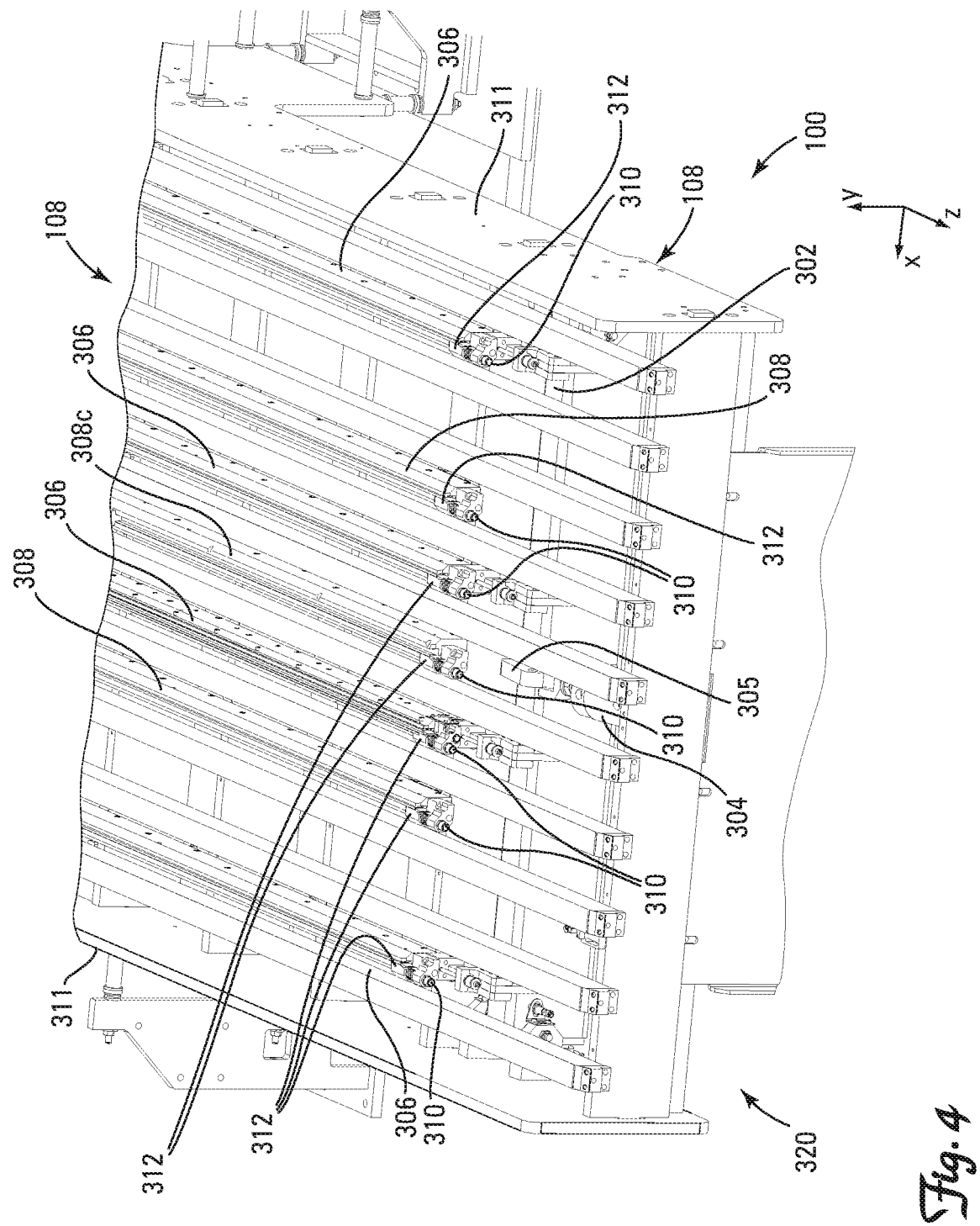
FIG. 4 is a perspective view of a portion of an additive manufacturing system illustrating an item movement system according to an embodiment of the present disclosure.
Figure 5:
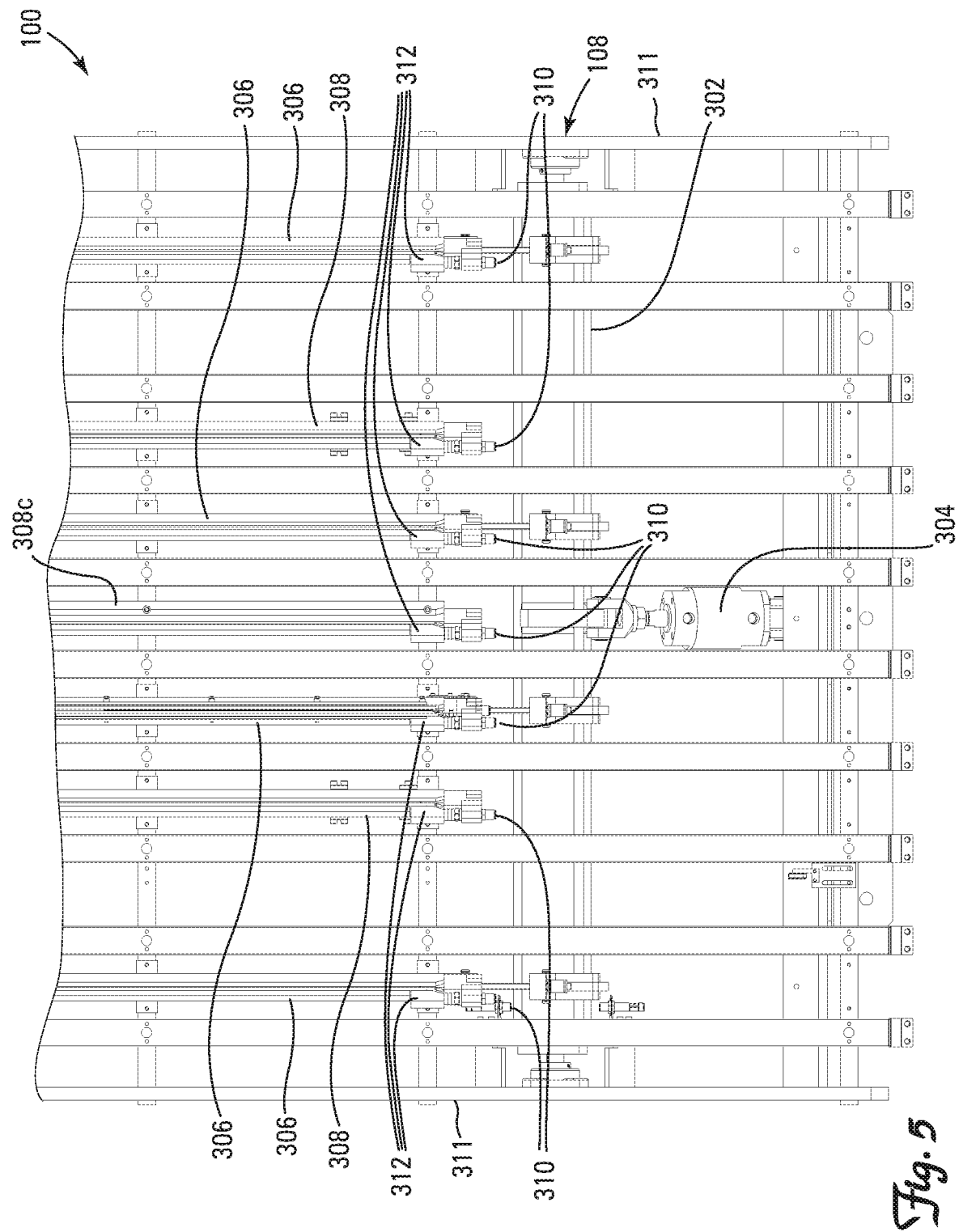
FIG. 5 is a top view of the portion of the additive manufacturing system of FIG. 4.

FIGS. 4-5 show closer views of the portion of the gantry 108 where the rails 306 and 308 interact with the torque tube 302 and torque cylinder 304.

FIG. 6 is a perspective view of the torque tube 302, torque tube cylinder 304, and rails 306 and 308 of the gantry 108 without other components shown, to more clearly show their arrangement. The torque tube is rotatable as shown by arrow 322 to allow for the movement of the driven rails 306 forward and back between their first and second positions with the extension and/or retraction of the torque tube cylinder 304.

Figure 7:
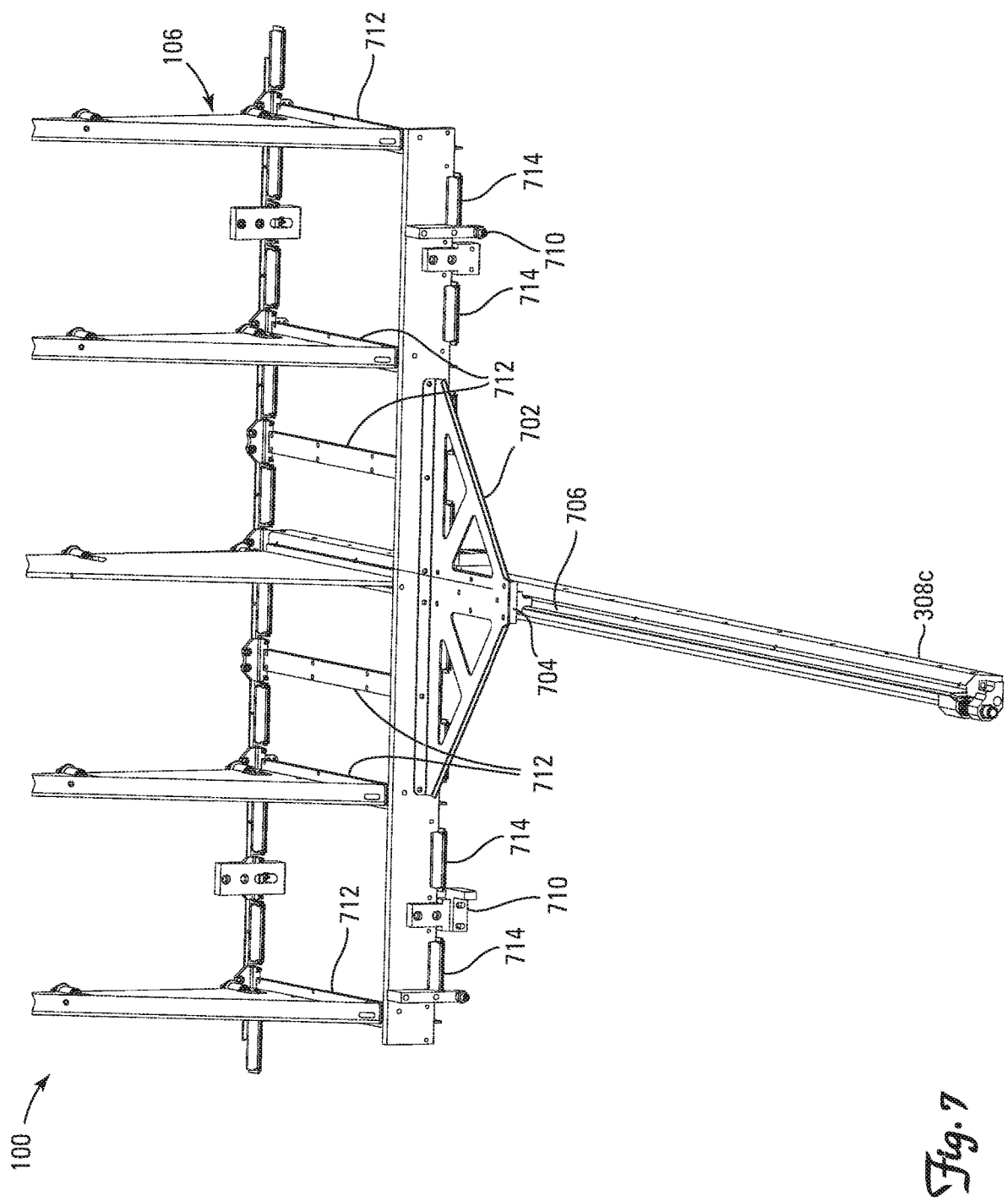
FIG. 7 is a perspective view of a drive rail and platen according to an embodiment of the present disclosure.
Figure 8:
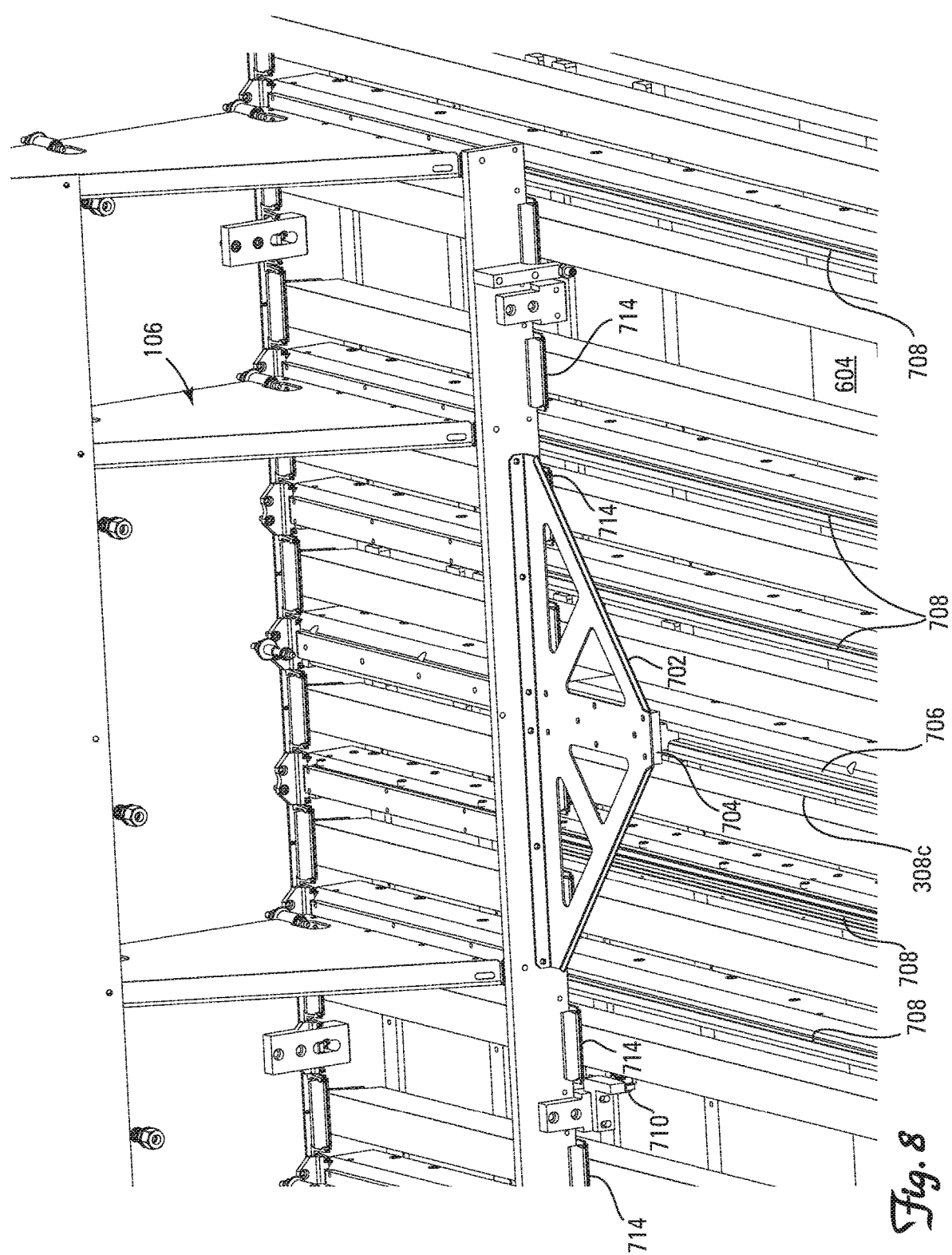
FIG. 8 is a close-up perspective view of a portion of a platen and drive system according to an embodiment of the present disclosure.

FIGS. 7 and 8 are perspective views of the platen 106 and center fixed rail 308c (FIG. 7) and the platen 106 on gantry 108 (FIG. 8). As is seen in FIGS. 7-8, a guide portion 702 of platen 106 is connected to a T-shaped member 704. T-shaped member 704 has a substantially vertical portion that moves within slot 706 of center fixed rail 308c, which is used in this embodiment as an alignment rail. An item being printed is guided along the gantry 108 through the interaction between the T-shaped member 704, the guide slot 706, and the clamps 312 of the gantry 108. T-shaped member 704 functions in one embodiment as a center alignment keel, and in one embodiment, it extends from a front portion of the guide portion toward the front part of the platen 106, near to where a starter piece (such as starter pieces 900 and 1200 described further below) is used. The center alignment keel allows for centering of the platen 106 on the gantry 108. Travel limit sensors 710 are used in one embodiment to limit the movement of the platen 106 so that it does not travel outside of defined position limits. Platen 106 further has support pads 714 at its front and its rear, which serve to support the platen 106 on the gantry 108 (shown and described in further detail with respect to FIGS. 14-16 below). When a clamp 312 for a rail 306 or 308 engages, the keel for that particular rail is clamped to its rail so that it cannot move except with movement of the rail. Therefore, in the motion of the driven and non-driven rails is made, the movement of the clamped rails also moves the platen 106, and consequently, an item that is being printed.

In building very long parts or parts in segments, new layer alignment in the X-Y plane may become problematic. Small misalignments can lead to larger overall errors as part length increases. Alignment of a new layer to a previously printed layer is performed in smaller systems with a continuous Z motion mechanism that provides proper tolerances. Once a part gets larger, continuous Z motion mechanisms that are longer than the entire part are difficult to build, and can become unwieldy. In one embodiment, at the boundary of the Z axis, a separate mechanism is used to move the part to allow the Z axis to recover its length and to continue building the part. These functions are discussed herein as local Z and the Z drive respectively.

The Z drive operates in various embodiments as described herein. The Z drive allows for movement of a part in a Z direction. Once a part has been shifted in the Z direction by the Z drive, alignment in the X-Y plane may not be accurate. In order to continue properly aligned part building, registration in the Z direction is performed, such as by using the touch probe as discussed herein, and registration in the X-Y plane is performed as follows. Once the Z registration is performed, the part location in Z is known. To register the part correctly in the X-Y plane, in one embodiment, an X-Y fiducial is used.

Such a fiducial may be part-based, that is, on the part being printed, or may alternatively be in a support structure. While the fiducial may be formed from support material or from part material, when the fiducial is formed from part material, the fiducial behaves in the same way that the part does during cooling, such as but not limited to the amount and timing of sag, and the like. That is, when the fiducial is formed out of the same material as the part, the fiducial behaves similarly to the part in the build chamber (e.g., if the part sags, the fiducial also sags.

Use of a fiducial, either part-based or support-based, provides a method for determining the XY alignment and the Z displacement. In one embodiment, a fiducial comprises a specific part geometry that is constructed along with the target geometry. A measurement system capable of measuring the embedded fiducial geometry determines X-Y alignment. In one embodiment, the part geometry of the fiducial comprises a right angle of material constructed at a known location relative to the target geometry. One or more fiducials may be constructed on each layer of the part.

Figure 17:
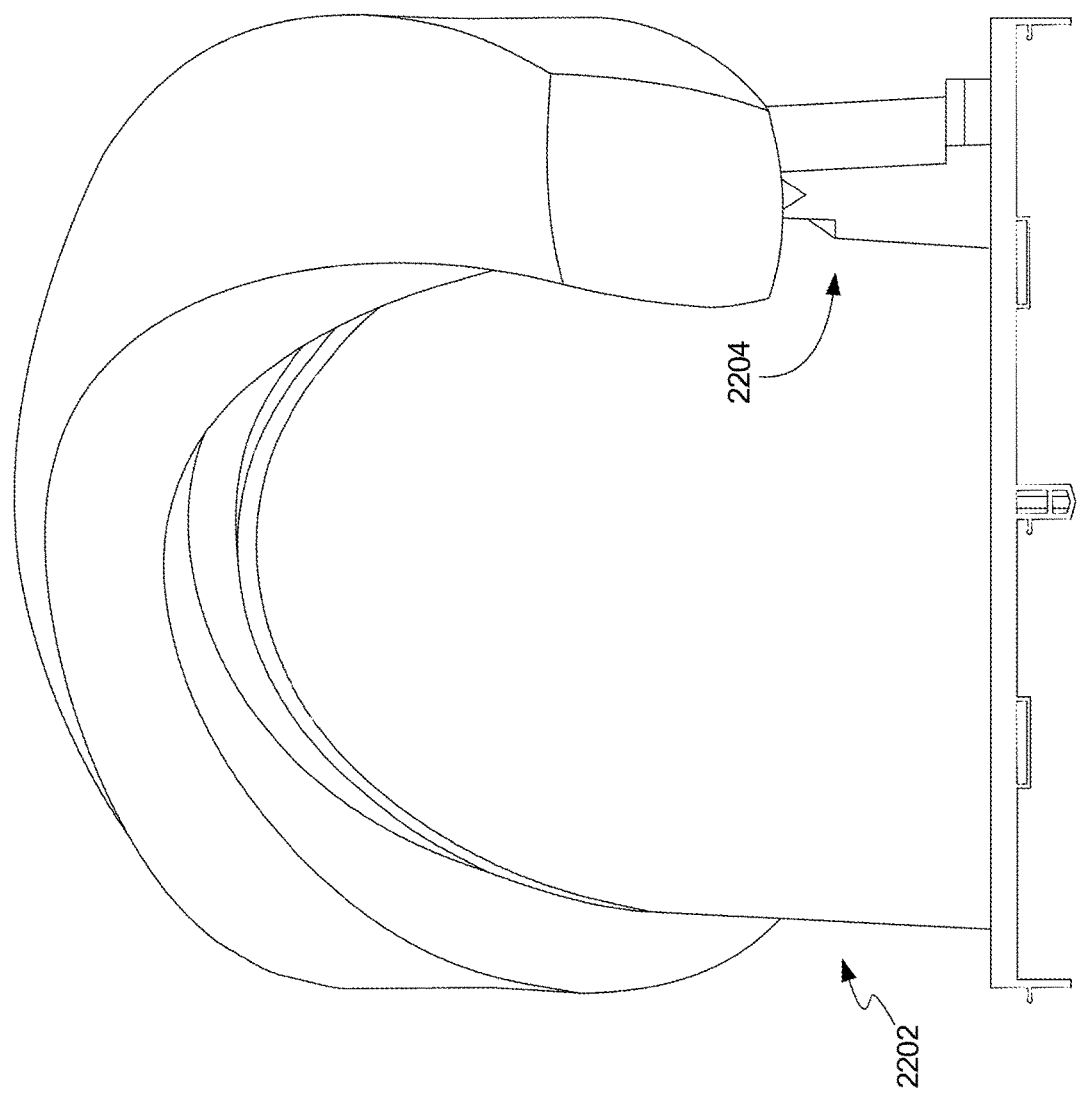
FIG. 17 is a perspective view of a fiducial according to another embodiment of the present disclosure.
Figure 18:
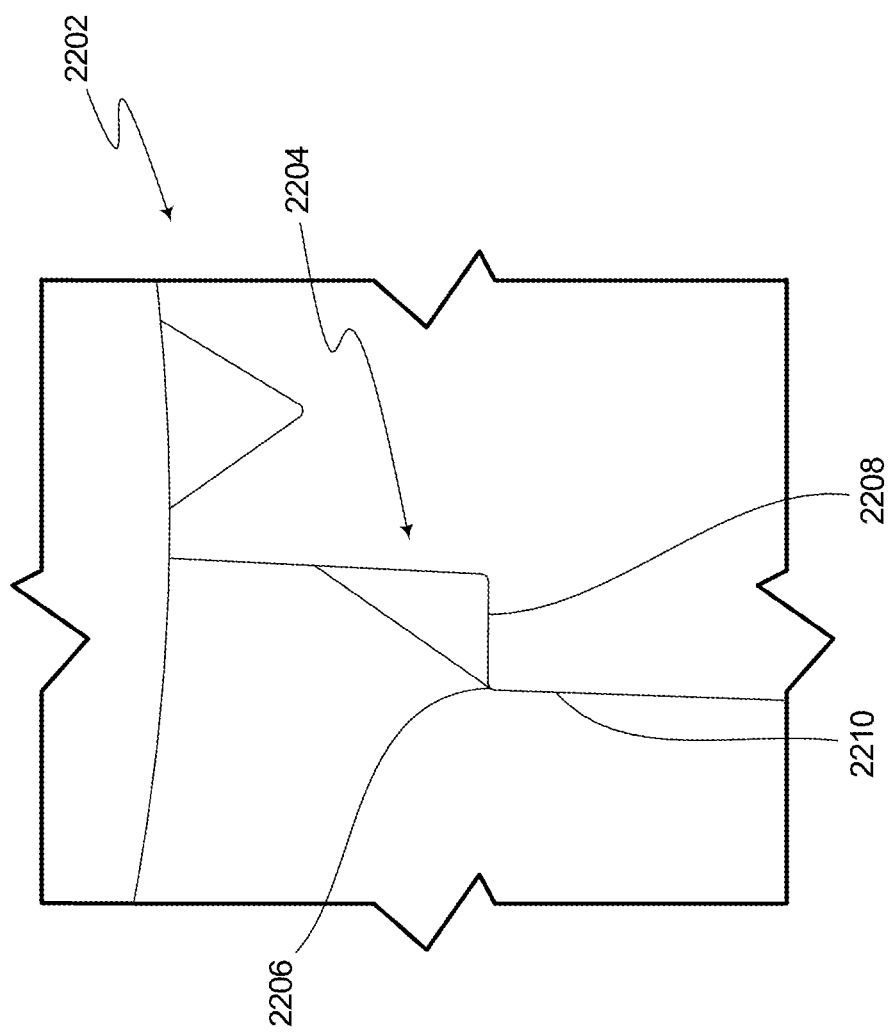
FIG. 18 is a close-up view of the fiducial of FIG. 17.

A single fiducial on a part is shown in FIG. 17. FIG. 17 shows a part 2202 with a single fiducial 2204. The fiducial 2204 is constructed in a manner that allows a measurement system (such as the touch probe 118) to properly determine the location of the fiducial in X and Y. Fiducial 2204 is shown in closer detail in FIG. 18. Fiducial 2204 comprises in this embodiment a known X-Y offset point 2206, an X reference edge 2208 extending from the known offset point 2206, and a Y reference edge 2210 extending orthogonal to the X reference edge from the known offset point 2206. The known offset point 2206 is the vertex of a right angle having sides 2208 and 2210. As shown, the fiducial 2204 is on a part 2202. However, when the part being printed uses support structures, a fiducial or fiducials may alternatively be built into the support structure without departing from the scope of the disclosure.

Just prior to displacing the part in Z with the Z drive, the system in one embodiment measures the Z location, such as with the touch probe described herein, and measures a location of the fiducial to get a known X-Y location before movement of the part. Once the part is displaced, the Z location of the part and the X-Y location of the fiducial are determined again, providing a new location in X, Y, and Z. The new location of the fiducial is compared to the previous location of the fiducial, or to the planned part location. The new Z location is compared to the previous Z location. This information allows the system to compensate on the fly for the Z displacement as well as X-Y alignment. In another embodiment, use of more than one fiducial may be used to compensate for XY rotation, and for shifts in the Z plane.

In operation, a method for determining an X, Y, and Z position comprises determining a Z position as described herein, and determining an X and a Y position as follows. A measurement system determines the location of the Y reference edge 2210 by moving an element, such as a probe, to contact the Y reference edge 2210, giving the Y location. The measurement system determines the location of the X reference edge 2208 by moving the element to contact the X reference edge 2208, giving the X location. Once the X and Y locations of the reference edges 2208 and 2210 are known, the offset point 2206 is known, and a precise location in X-Y is also known. Coupled with the determined Z position, the position of the part in X, Y, and Z is known to the precision of the probe. In one embodiment, a measurement system used for determining X and Y positions uses on the order of 0.25 inches of clearance with X and Y reference edges of at least 0.02 inches long. As measurement elements continue to improve, clearance and length of reference edges may change without departing from the scope of the disclosure.

Embodiments of the present disclosure are capable of printing multiple layers of a part before movement of the part is effected by the system 100 as described herein. While X, Y, and Z position can be determined after each layer, in one embodiment, multiple payers are printed before X, Y, and Z positions are determined. In one embodiment, before the system 100 moves the part after a number of layers have been printed, the X, Y, and Z positions are determined as described herein. Following movement of the part in the Z direction, another determination of the X, Y, and Z positions is made for registration of subsequent layers on the part.

A fiducial, such as fiducial 2204, is generated in one embodiment using a digital file built with the fiducial appropriately configured in the digital file. Given part geometry, an element of the actual part may be suitable for use as a fiducial without any modification. This could occur, for example, where the part has a defined right angle edge that is properly aligned with the build platform. In this embodiment, the feature structure of the part may be used as a fiducial. In other embodiments, a fiducial is built into support structure for the part. Creating a fiducial comprises in one embodiment generating a digital file containing a fiducial, and building a part with the file. A file for building a part in this manner contains structure therein with a known substantially horizontal and a known substantially vertical component that is capable of being used as a fiducial.

Figure 19:
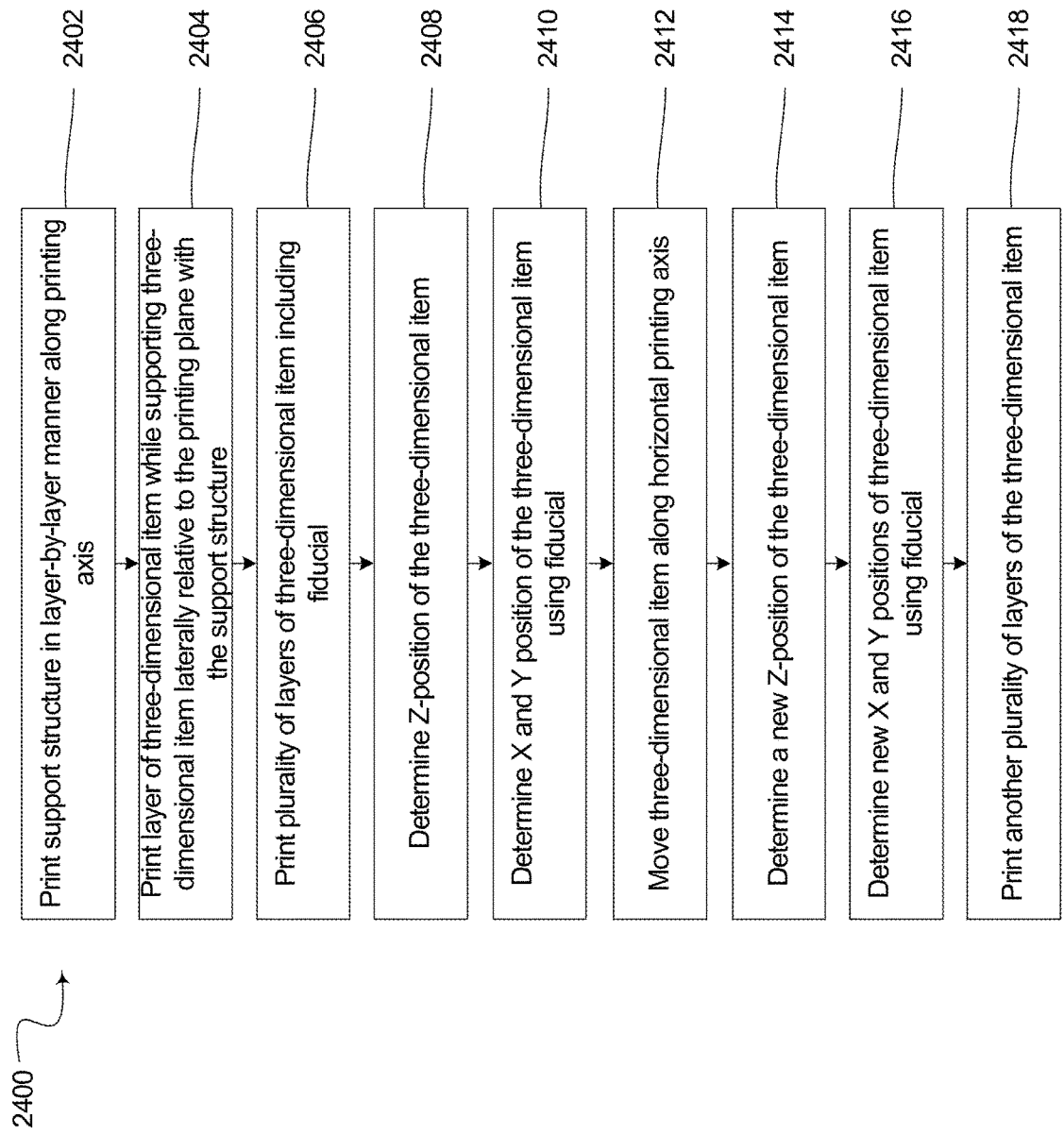
FIG. 19 is a flow chart of a method according to an embodiment of the present disclosure.

A method 2400 of building a three-dimensional item in an additive manufacturing system is illustrated in flow chart form in FIG. 19. Method 2400 comprises printing a support structure for the three-dimensional item in a layer by layer manner along the printing axis in block 2402, and printing a layer of the three-dimensional item while supporting the three-dimensional item laterally relative to the printing plane with the support structure while printing the three-dimensional item in block 2404. Building the part further comprises printing a fiducial structure having a known substantially vertical and a known substantially horizontal component. Printing the three-dimensional item in a layer-by-layer manner is performed in one embodiment along a horizontal printing axis parallel to a build plane in the additive manufacturing system. Printing the fiducial structure comprises printing the fiducial structure in the support structure in one embodiment, or as a portion of the three-dimensional item in another embodiment.

Method 2400 may further comprise printing a plurality of layers of the three-dimensional item, including the fiducial structure in block 2406, determining a Z position of the three-dimensional item in block 2408, determining an X and Y position of the three-dimensional item using the fiducial structure in block 2410, moving the three-dimensional item along the horizontal printing axis in block 2412, determining a new Z position of the three-dimensional item in block 2414, determining new X and Y positions of the three-dimensional item using the fiducial structure in block 2416, and printing another plurality of layers of the three-dimensional item in block 2418. The printing of another plurality of layers uses the new positions of X, Y, and Z to register the another plurality of layers to the previously printed layers. In one embodiment, determining an X and a Y position for the three-dimensional item comprises moving the touch probe vertically to contact a known substantially horizontal edge of the fiducial to determine the X position, and moving the touch probe horizontally to contact a known substantially vertical edge of the fiducial to determine Y position.

In additive manufacturing systems, a byproduct of printing is waste material that can build up on a print head or tip, material extruded from a print head to expend one material to be replaced by another, material that has been stored for a period of time in a print head that has degraded, and the like. The process of additive manufacturing uses automated cleaning maintenance and priming of the modeling tool for quality printing and for accurate auto calibration of the modeling tool. For example. in additive manufacturing, multiple tools may be swapped in and out during the part build to alter materials, colors, and tool tips of varying geometries. As the tool tip location varies slightly due to tolerances the tip position is learned so its position can be aligned with the prior tool's tip location. Contamination or buildup on the modeling tip may compromise the accuracy of the homing calibration process. Further, prior to being swapped in, the modeling tool may have been stored for a period of time. The material resident in the tool is subject to degradation and may be purged and refreshed with new material in order to prevent part quality issues.

In one embodiment, a waste purge system removes purged waste material from the tool service location to a waste location. Conventional disposal processes are oriented vertically where gravity can be used for transport of the waste material. In embodiments of the present disclosure which use a vertical print plane and horizontal printing, a separate system is used to transport waste material horizontally. In one embodiment, a high volume vacuum is used to collect and transport material that is discharged from a modeling tool oriented horizontally. This method may also be utilized to enhance the efficiency and speed of a conventional vertical modeling tool.

Figure 20:
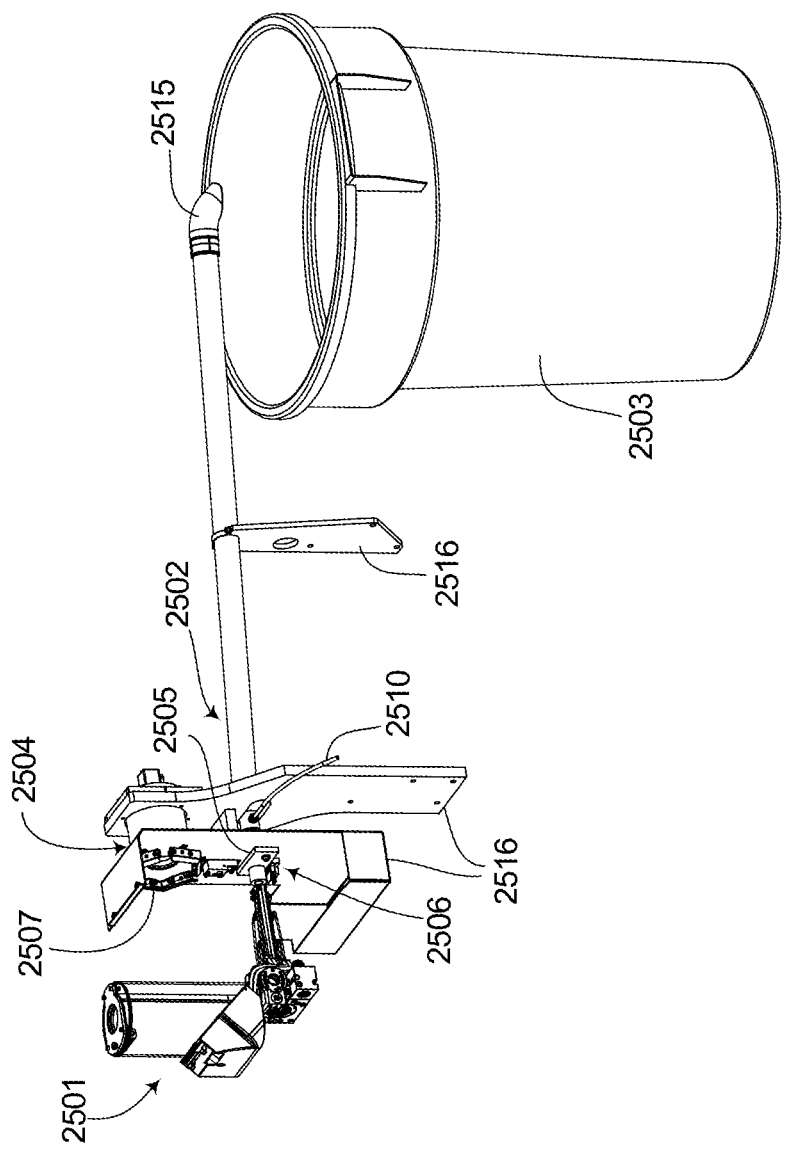
FIG. 20 is a perspective view of a purge system according to an embodiment of the present disclosure
Figure 21:
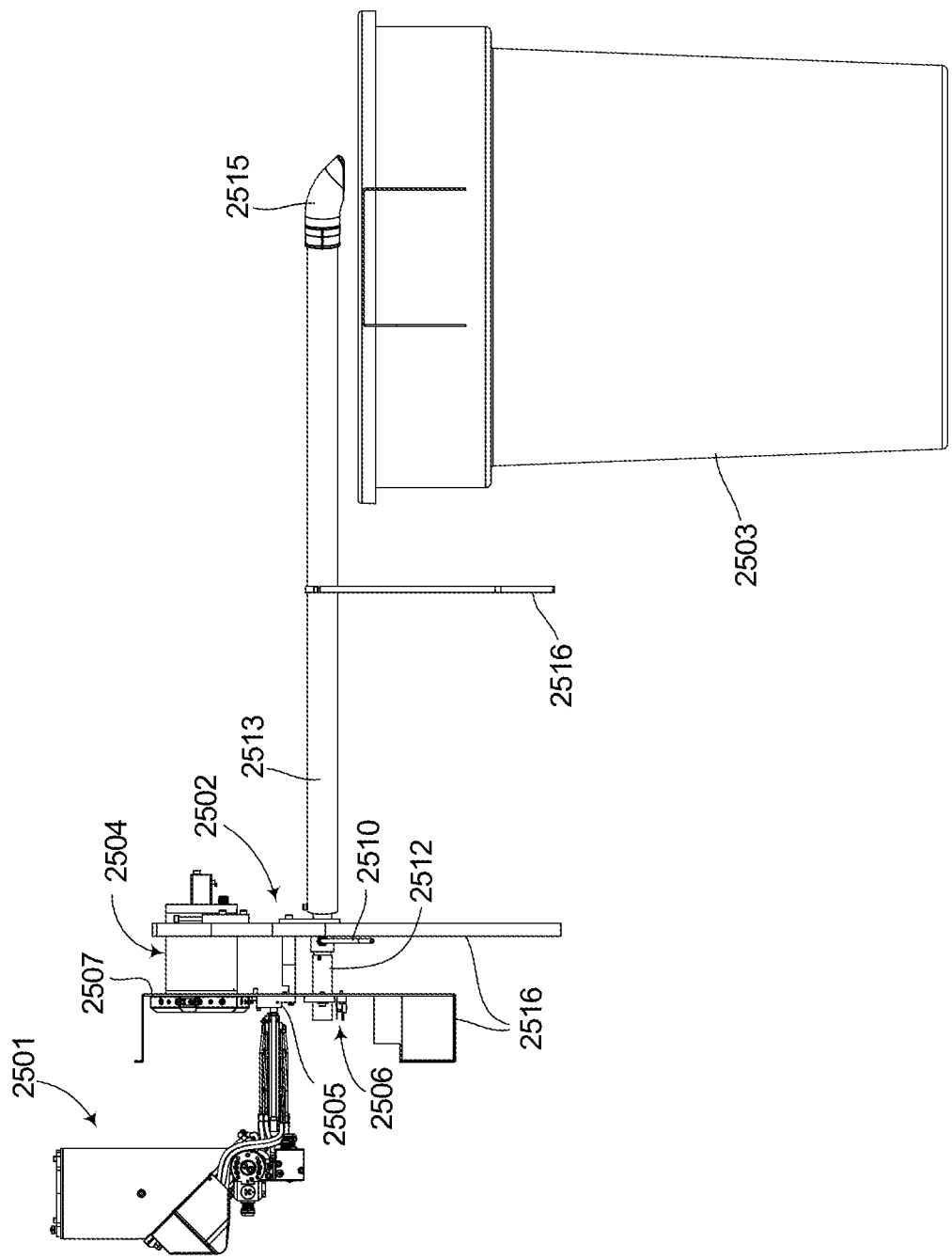
FIG. 21 is a side elevation view of the purge system of FIG. 20 in a Z detection position.
Figure 22:
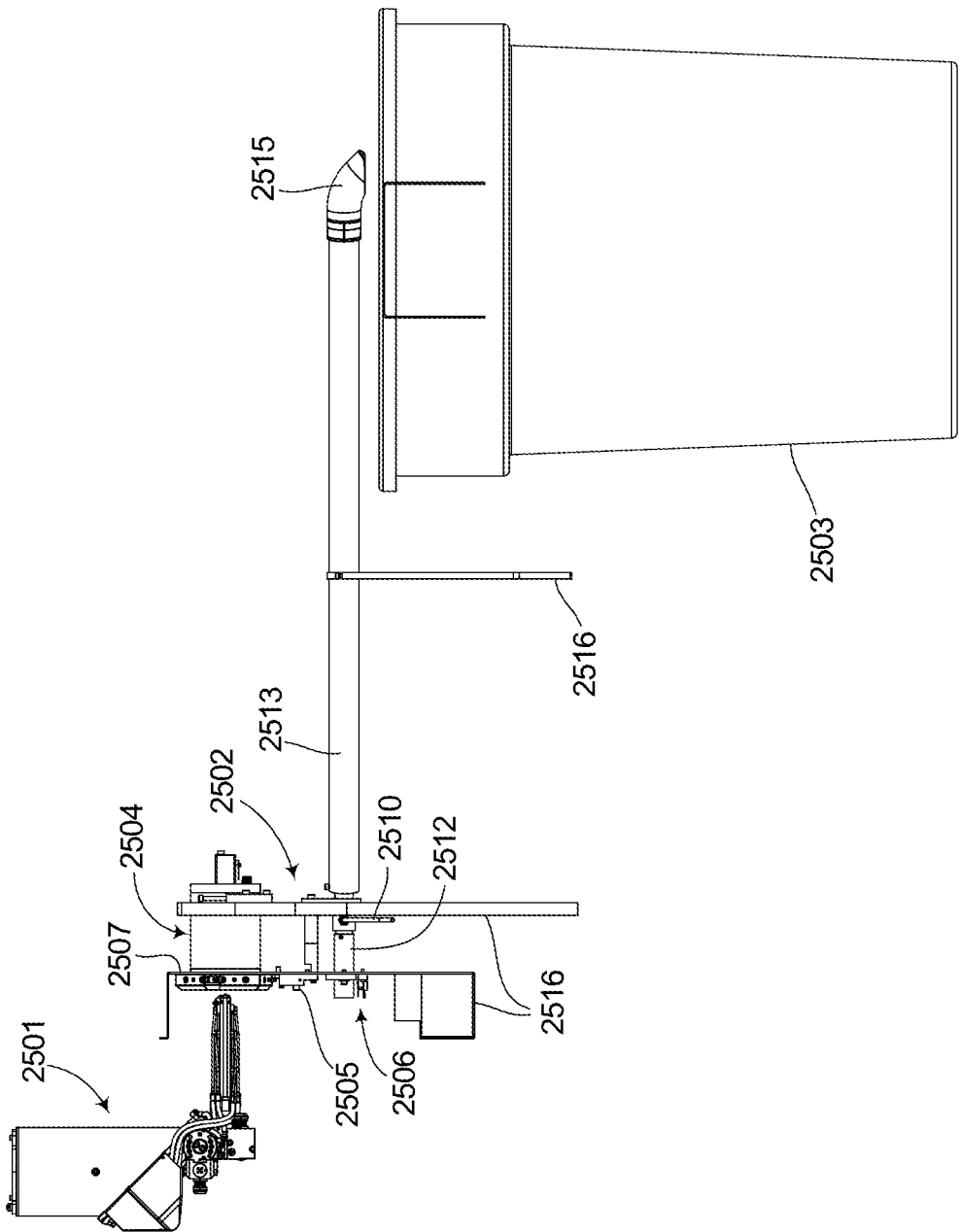
FIG. 22 is a side elevation view of the purge system of FIG. 20 in an X Y detection position.

As illustrated in FIGS. 20, 21, 22, and 23, the modeling tool traverses in a vertical XY plane to build a part that grows in the Z direction. The purged material is transported in the horizontal Z direction as well. FIG. 20 shows an isometric view of a vacuum purge system 2502 along with a modeling device 2501, and waste bin 2503. Purge system 2502 includes tip sensing apparatus 2504 and 2505, and tip cleaner 2506. Tip cleaner 2506 is used to scrub any residual material from the modeling tip before tip sensing apparatus 2504 and 2505 sense the tip location. A tip cleaner such as tip cleaner 2506 is disclosed in further detail in U.S. Pat. Nos. 6,722,872 and 7,744,364, which are commonly owned by the assignee of the present disclosure. Sensor 2505 is in one embodiment an open close contact that detects the tip location in the Z direction, and sensor 2504 is in one embodiment a camera to detect the tip location in the X Y directions. Sensor 2504 is surrounded in one embodiment by a light array 2507 to better illuminate the tip for the camera. FIG. 20 shows the model tool in a purge position, FIG. 21 shows the model tool in a Z detection position, and FIG. 22 shows the model tool in an XY measuring position. Items 2516 are structural members used to locate and support the purge components.

Figure 23:
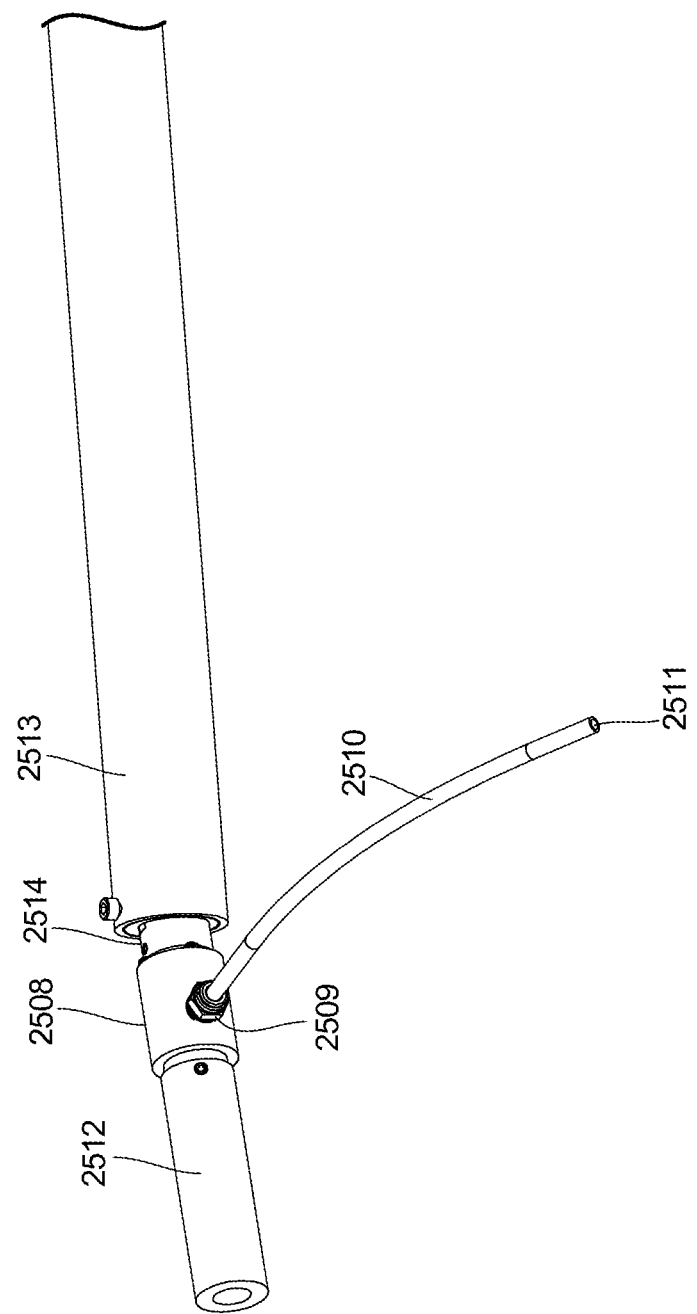
FIG. 23 is a close-up perspective view of a portion of the purge system.

FIG. 23 shows a close-up perspective view of a portion of the purge system 2502 in greater detail. Purge system 2502 further comprises a vacuum generator 2508 (such as, for example only, a model ZH10-X185 available from SMC Corporation), a tube fitting 2509 to which a plastic tube 2510 is attached, and to which air of sufficient pressure and flow is provided to enable vacuum generator 2508 to produce a vacuum into tube 2512. Tube 2512 is, in one embodiment, a tube with suitable inside geometry to draw in without obstruction purged material from a modeler tool (such as tool 2501). Tube 2512 may use tapered geometry to allow a less precise location of the modeling tip. Alternatively, tube 2512 may be reduced in diameter to increase air velocity to better draw in the purge, or configured in other ways that will be apparent to those of skill in the art to benefit the purge process.

An unobstructed low friction straight tube 2513 directs the purge material to an external waste container 2503 (see FIGS. 20-22). Coupling 2514 couples tubes 2512 and 2513 and in one embodiment, has a small angle to redirect the purge material to the straight tube 2513, and deflector 2515 is also angled so as to direct the purged material into waste bin 2503 without creating an obstruction to block purge material. It should be understood that the angles of such tubes and couplings may be modified without departing from the scope of the disclosure.

Starter Pieces

Figure 9:
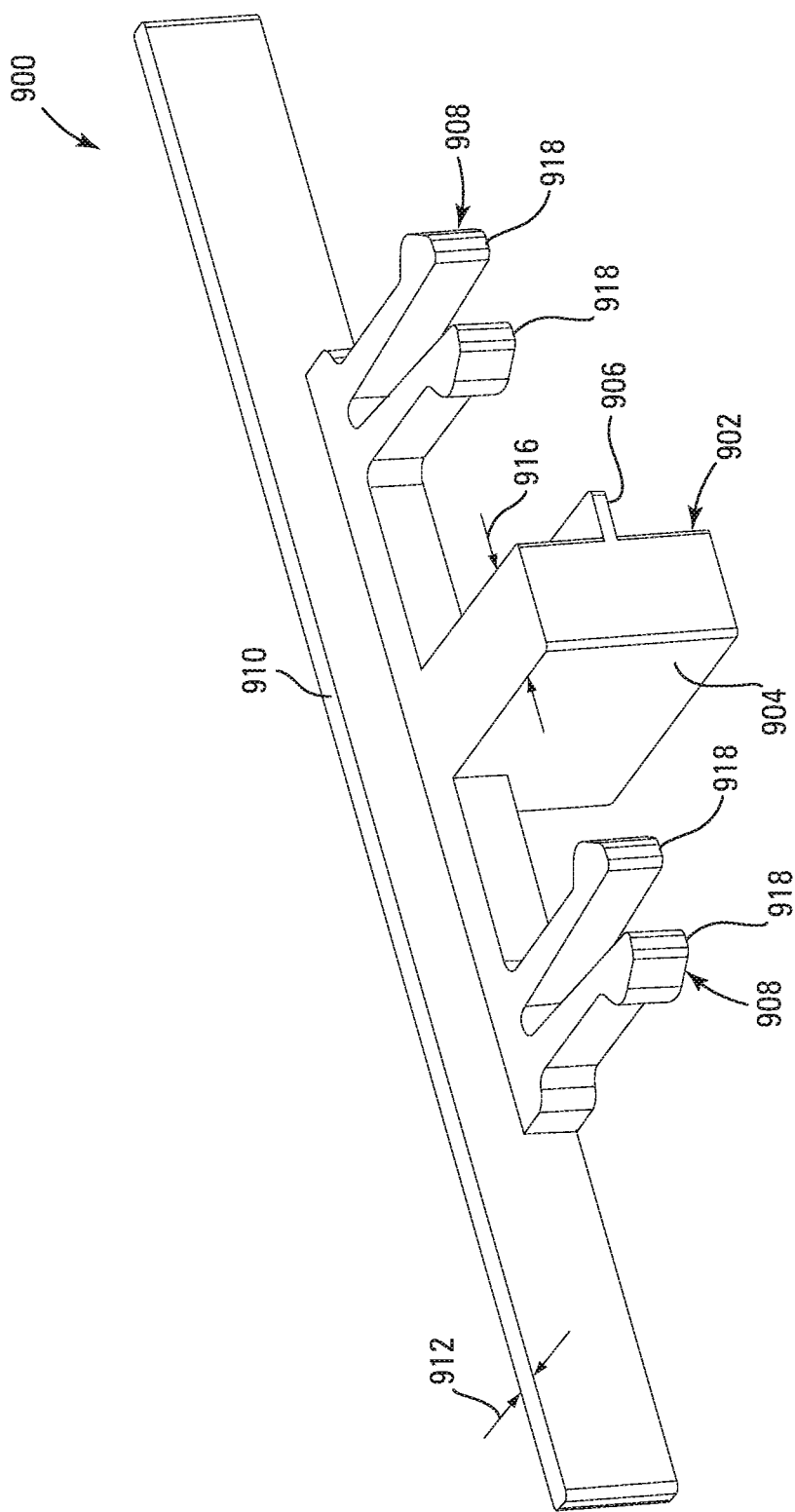
FIG. 9 is a perspective view of a starter piece according to an embodiment of the present disclosure.
Figure 10:
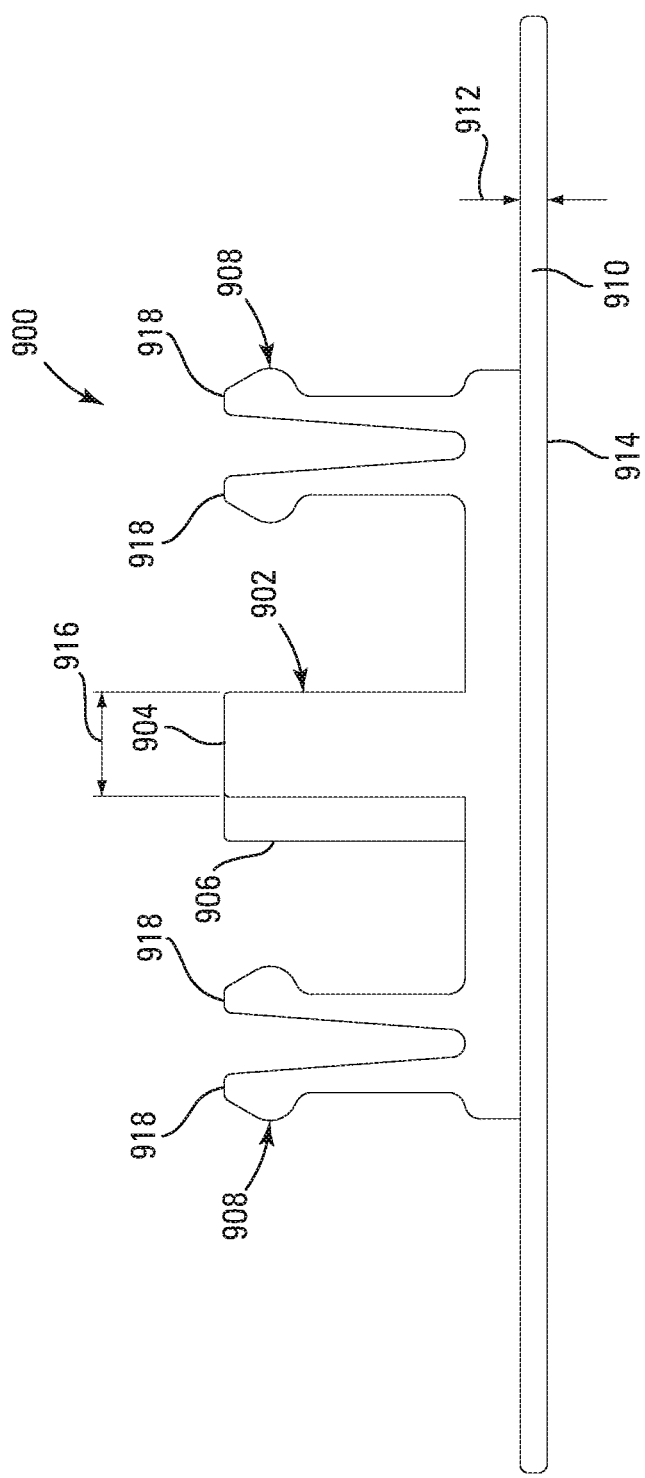
FIG. 10 is a top view of the starter piece of FIG. 9.
Figure 11:
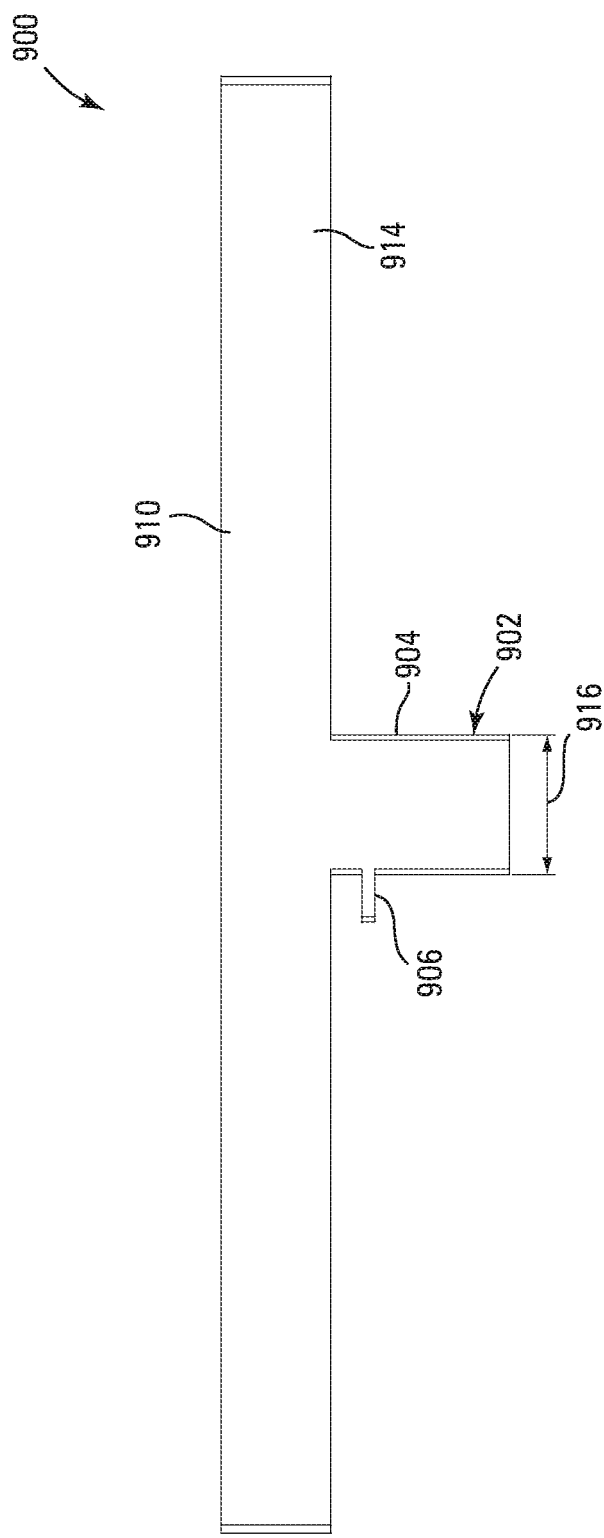
FIG. 11 is a rear elevation view of the starter piece of FIG. 9.

Referring now to FIGS. 9-13, views of starter pieces (e.g., starter keels) 900 (FIGS. 9-11) and 1200 (FIGS. 12-13) are shown. The starter pieces fit under the platen 106 and above the rails of the gantry 108 to provide a base for the building of the item. FIG. 9 show starter piece 900 in perspective. Starter piece 900 is a center starter piece, and comprises a main body 910 comprising a face surface, a keel 902 coupled to the main body 910 and including keel body 904 and guide tab 906, and at least one retaining mechanism 908. Keel face surface 910 has a thickness 912. The thickness 912 is chosen in one embodiment to allow an abutting match of thickness between the main body 910 and a build sheet mounted to the platen 106, so that at a start of a build operation for an item, front edge 914 aligns with the build sheet to form a smooth transition therebetween. Keel body 904 has a width 916. This width allows the keel body to align with center guide rail (e.g., center rail 308*c*) of gantry 108 to assist in alignment of the item on the gantry 108. The width 916 of keel body 904 allows the center starter piece 900 to be fixed with respect to x-axis movement.

Guide tab 906 fits into a slot (not shown) in center rail (e.g., center rail 308*c*) to assist in fixing the starter piece 900 with respect to y-axis movement. The engagement of guide tab 906 with the slot in the rail helps the item to not float in the Y-direction.

Figure 12:
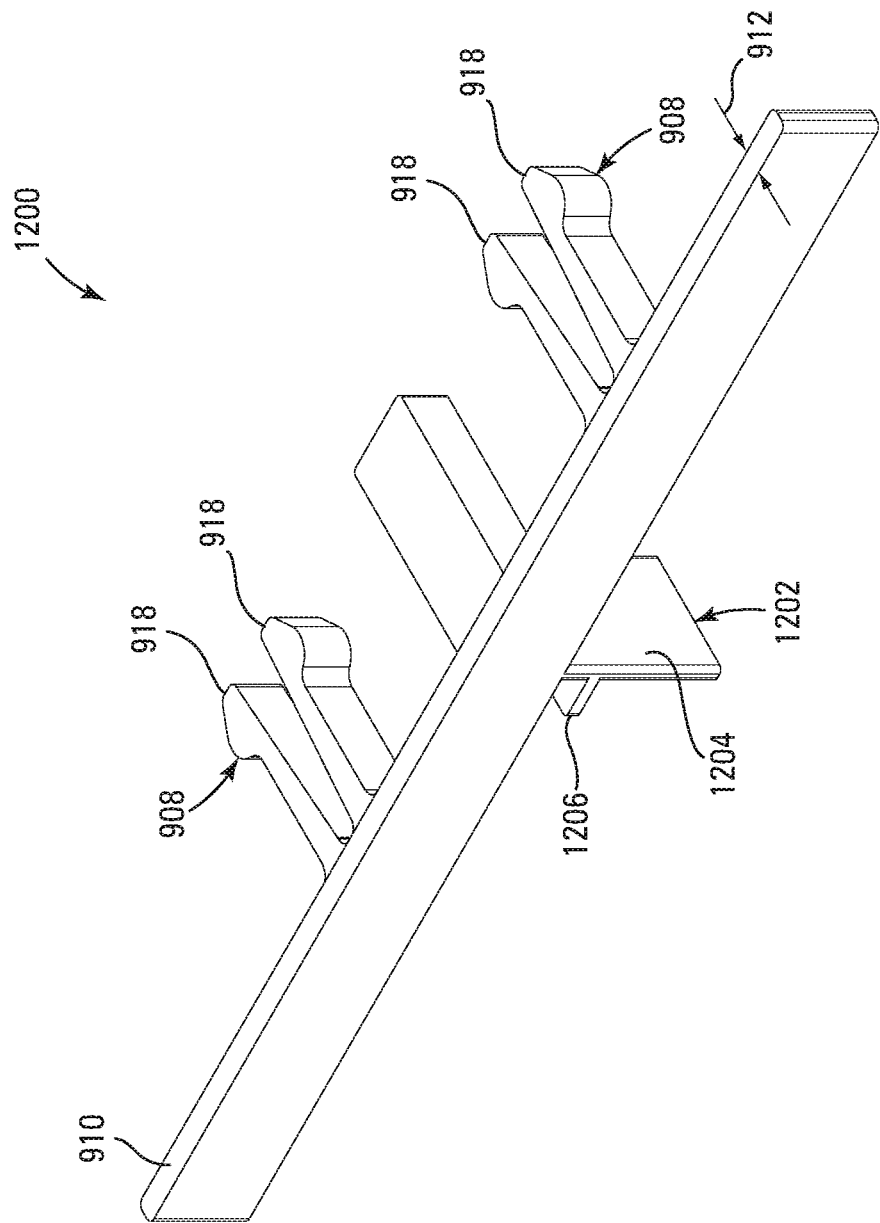
FIG. 12 is a perspective view of another starter piece according to an embodiment of the present disclosure.
Figure 13:
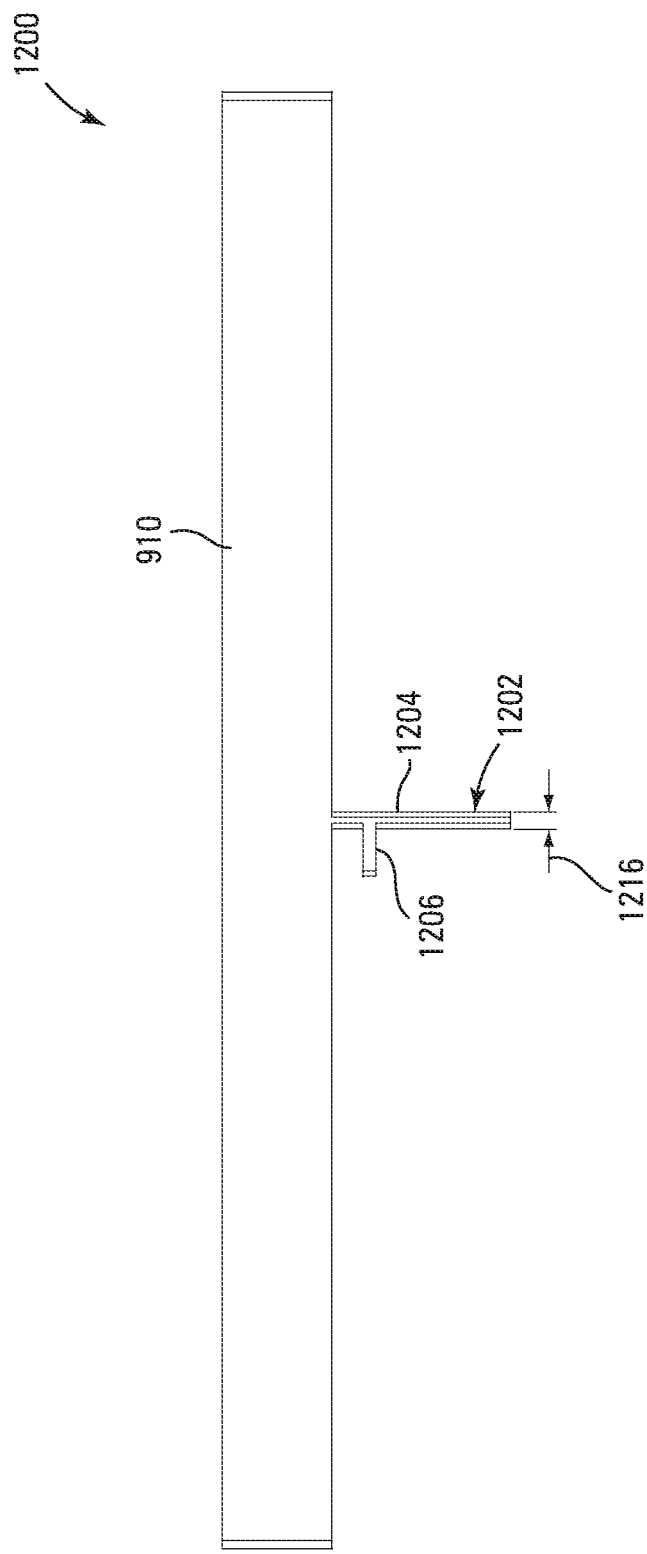
FIG. 13 is a rear elevation view of the starter piece of FIG. 12.

Starter piece 1200 is a non-center starter piece, is shown in FIGS. 12-13, and comprises a main body 910 comprising a face surface, a keel 1202 coupled to the main body 910 and including keel body 1204 and guide tab 1206. At least one retaining mechanism 908, main body 910, and keel front edge 914 are identical to those parts of keel 900. Main body 910 of starter piece 1200 has a thickness 912 the same as main body 910 of keel 900. Keel body 1204 has a width 1216 which allows the keel body 1204 to align with guide rails 308 that are not a center guide rail (308c) of gantry 108. The width 1216 of keel body 1204 allows the starter piece 1200 to float with respect to x-axis movement.

Figure 14:
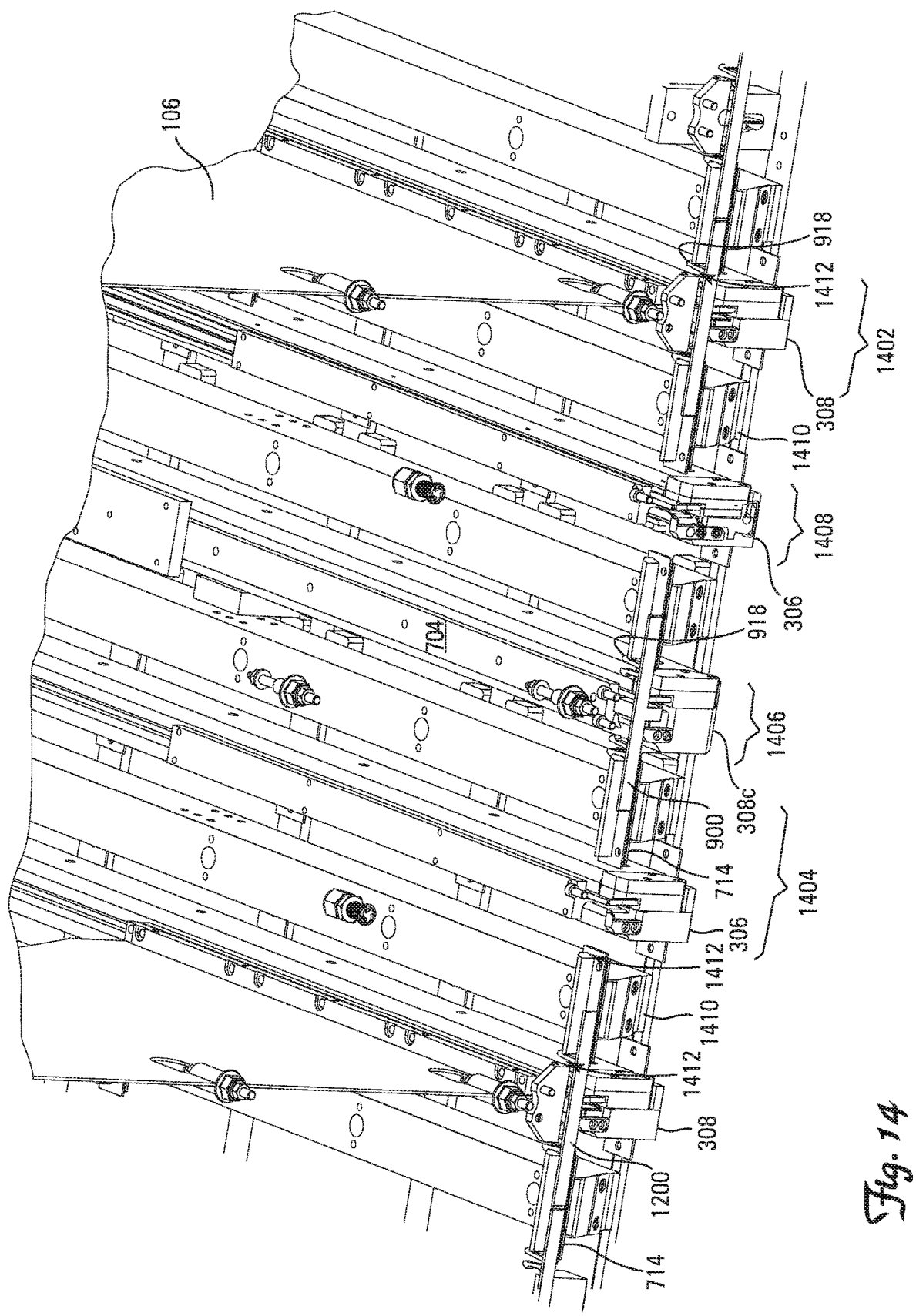
FIG. 14 is a perspective view of starter pieces in place on an additive manufacturing system according to an embodiment of the present disclosure, with parts of the system removed to show detail thereof.

FIG. 14 shows a close-up perspective view of a portion of the platen 106, starter pieces 900 and 1200, and their interactions with the rails 306/308 of the gantry 108. Parts have been removed to show more clearly the positioning and interaction between the parts. Specifically, the area marked as area 1402 has had the platen face panel removed; the area marked as area 1404 has had the platen face panel, support structure for the platen panel, and a starter piece 1200 removed; the area marked as area 1406 has had the platen face panel, support structure for the platen panel, and a portion of the rail 308c removed; and the area marked as area 1408 has had the platen face panel, support structure for the platen panel, a portion of the rail 306, and a starter piece 1200 removed. The various views allow the showing of the engagement of starter pieces such as keels 900 and 1200 with rails such as rails 306 and 308.

Keels 900 and 1200 as shown in areas 1406 and 1402, respectively, have protrusions 918 that comprise in one embodiment the at least one retaining mechanism 908. The protrusions 918 engage openings 1412 in the platen 106. Gaps 1412 are better seen without a starter piece in area 1404. The double protrusions 918 allow a starter piece to be snapped into the gap, and further, provide a protection against torque twisting of the starter pieces during item production. Because there are two independent protrusions 918, vibrations and torsions of the platen 106 and the starter piece mounting area are dampened, so that the movement is not imparted to the starter piece main bodies 910, to help maintain continuity in the build process, and improves the quality of items being built. Since the starter pieces 900 and 1200 do not bend with movement of the structure into which they are snapped, build quality is improved allowing for items to be built with increasingly tight tolerances. When items are manufactured with tight tolerances, any variation due to machine part vibration or the like can be imparted to the item. The double protrusions 918 assist in reducing such a transfer of vibration from the apparatus to the item.

In building an item on the starter pieces and the build sheet, the geometry of the starter pieces is extended during the build operation to provide a platform to support the item during the build operation. The starter piece geometry is extended for the length of the build, providing support for the item during the build operation.

Figure 15:
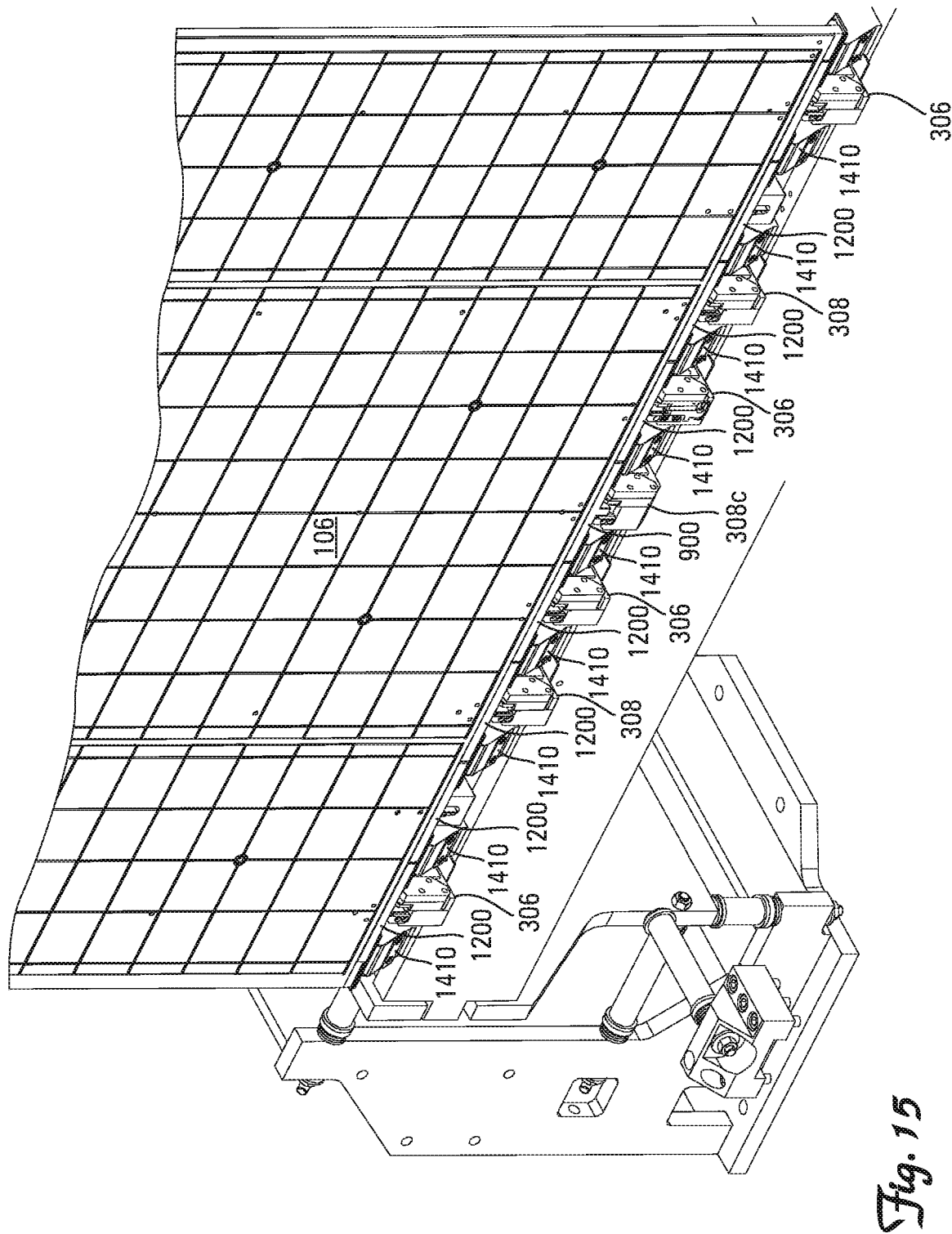
FIG. 15 is a perspective view of a portion of an additive manufacturing system according to an embodiment of the present disclosure, showing starter pieces, a platen, and a portion of a drive system.

Referring now to FIG. 15, a view similar to that of FIG. 14 is shown, but with the components of the apparatus 100 shown again. Platen 106 is shown with its positioning directly above starter pieces 900 and 1200. In one embodiment, one center starter piece 900 is used, and eight non-center starter pieces 1200 are used, with four starter pieces 1200 on each side of center starter piece 900. It should be understood that more or fewer starter pieces 1200 may be used without departing from the scope of the disclosure, and depending upon the size of the item to be built. Each starter piece is associated with one of a driven rail 306 or a fixed rail 308. Driven rails and fixed rails in one embodiment alternate in the x-direction on the gantry 108. Center starter piece 900 is placed at center rail 308c in one embodiment. In one embodiment, support rails 1410 are placed between driven rails and fixed rails so that no more than about 12 inches separates consecutive support rails 1410. As can be seen, support rails 1410 alternate with driven and fixed rails 306 and 308, so that there is y-direction support for a built item on the order of every six inches horizontally.

Figure 16:
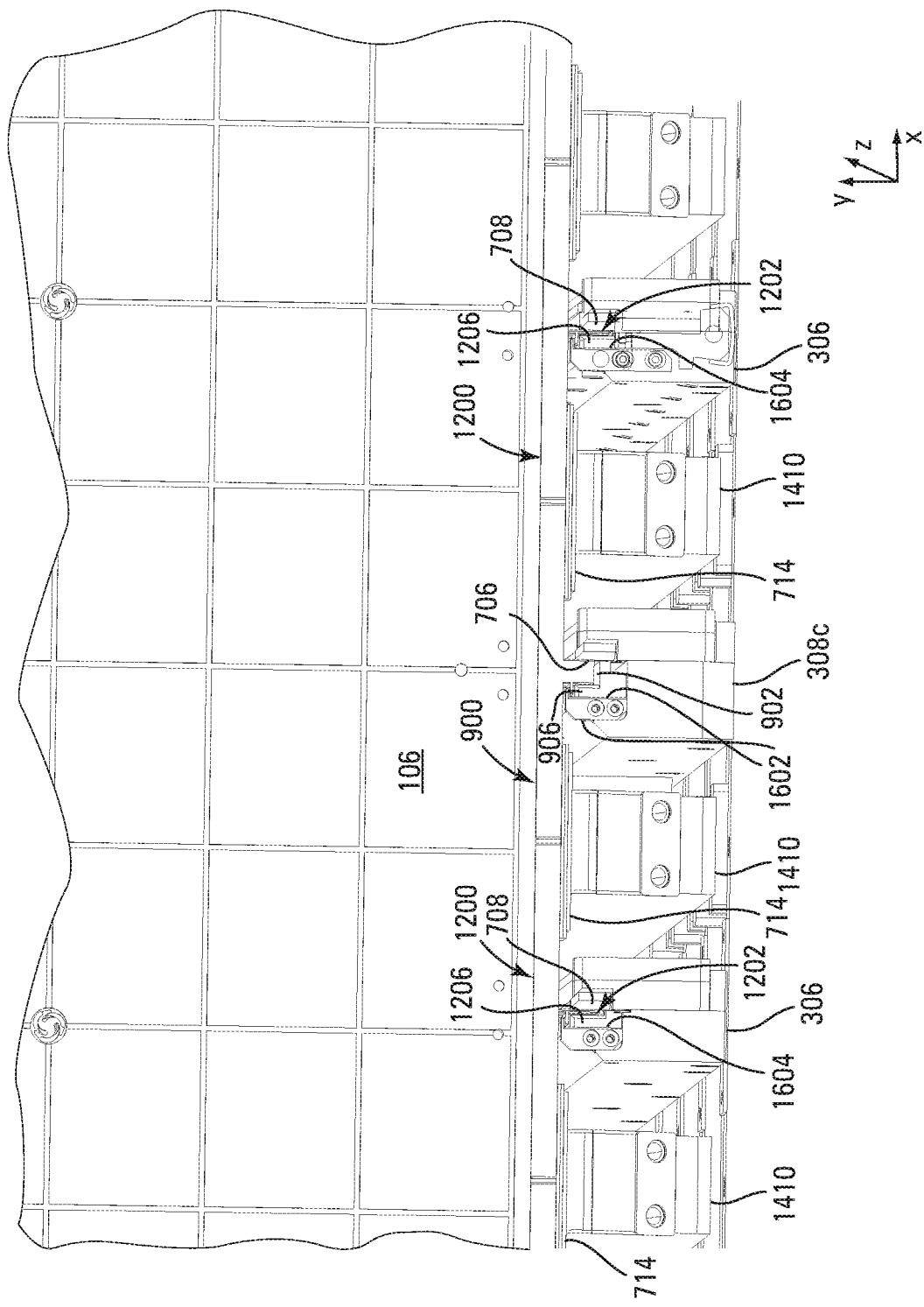
FIG. 16 is a close-up perspective view of a portion of an additive manufacturing system according to an embodiment of the present disclosure, showing starter pieces, a platen, and a portion of a drive system.

Referring now to FIG. 16, a close-up view of a portion of FIG. 15 is shown. FIG. 16 shows center starter piece 900 in place on center rail 308c, including keel 902 engaging slot 706 of center rail 308c, and guide tab 906 engaging horizontal slot 1602 in slot 706. Similarly, each starter piece 1200 has its keel 1206 engaging slot 708 of its respective driven or fixed rail 306 or 308, and its guide tab 1206 engaging horizontal guide tab slot 1604 in slot 708. Support pads 714 of platen 106 rest on support rails 1410. It is on these support rails 1410, under support pads 714, that the platen 106 slides during movement of the platen on the gantry. The support pads convey the weight of the platen 106 and item to the support rails 1410, and then to the ground.

The support rails 1410 sit at a location below a bottom of the item being printed. The starter pieces 900 and 1200 are used as a base from which to print down to form supports for the item being printed that extend to the support rails. As the platen 106 moves on the gantry 108, the item being printed transfers some of its weight to the platen, and some of the weight caused by the moment as the item extends away from the platen 106, to the support rails 1410 through the extended support formed from the starter pieces. Further, the geometry of each starter piece is replicated in the z-direction as well, to allow the platen 106 to be secured with mounting brackets 312 by their engagement with the extended geometry of the starter pieces within the slots of the rails 306 and 308 as the item is printed.

The keels 902 and 1202, and guide tabs 906, 1206, of starter pieces 900, 1200 engage slots in rails 306, 308 of the gantry. The keels 902, 1202 restrain movement of the starter pieces in an x-direction (as the x-direction is shown in the FIGS.) Specifically, keel 902 is nearly as wide as the width of its associated slot in center rail 308c, and serves as an alignment keel to restrict movement of the starter piece, and therefore of the platen and item being printed, in the x-direction. The keels 1202 of starter pieces 1200 are narrower than their associated slots in driven or fixed rails 306, 308, and float in the x-direction to allow the wider keel 902 in the center rail 308c to be the alignment keel for the platen 106 and the item being printed. Horizontally extending guide tabs 906 and 1206 engage horizontal channels extending from the slots in their respective rails, and restrict motion of the starter pieces, and therefore the platen and item being printed, in a y-direction (as the y-direction is shown in the FIGS.) Referring also to FIG. 16, the guide tab 906 engages channel 1602 in slot 706 of guide rail 308c, and guide tabs 1206 engage channels 1604 in slots 708 of remaining rails 306, 308, to prevent the starter pieces 900, 1200, the platen 106, and the printed item from moving in the y-direction.

In printing an item using embodiments of the system described herein, the print head initially prints multiple layers of a support structure on a starter piece during printing of the item itself, the support structure being printed layer-by-layer as described herein. The layers of the support structure are in one embodiment printed with increasing cross-sectional area in the vertical x-y plane to extend, at an angle of approximately 45 degrees in one embodiment, toward the support rails 1410 to ultimately provide support for the item by the support rails 1410 and not the starter pieces 900, 1200 or platen 106. This layering build-up is in one embodiment continued until the footprint cross-sectional area of the intended 3D item and support to the support rails 1410 is reached. At that point, the support rails 1410 support the weight of the item, relieving pressure on the item itself and the starter pieces 900, 1200. The geometry of the starter pieces 900, 1200 is printed and maintained along the length of the item in one embodiment, to allow for continued control of movement of the platen 106 and therefore the item with respect to the gantry 108.

In one embodiment, after approximately 100 layers of support structure and an item are printed, the item and its support structure are moved as described herein. As the item is moved as described herein, the item and its associated structure is moved in the direction of arrow 120 (FIG. 1), and the support structure slidably engages the support rails 1410, which support the weight of the item through the support structure formed extending from the starter pieces. This allows the support structure to rest on and slide across the top surface of support rails 1410 while platen 106 is indexed in the direction of arrow 120.

Removal of the item from the printed support and starter pieces after the piece is completed may be performed in various ways as is known in the art. The printing and indexing apparatus and methods described herein are amenable to use with various removal methods and structures.

Touch Probe

A touch probe 118 such as that discussed above is shown in greater detail in co-pending U.S. Patent Application Ser. No. 62/248,994, entitled "PROBE AND PRINTING METHODS FOR ADDITIVE MANUFACTURING SYSTEM".

In operation, the touch probe 118 is used to register the location of the platen at an initial item build, and is used to register the location in the z-axis of the item being built as it is being built, or any portion of the item as it is being built. With the resolution of the touch probe 118 being smaller than the resolution of the print head printing, the location of the item, platen, build sheet, or the like is determined by the touch probe 118 with an accuracy that is more fine than the resolution of the print head. Registration operation in one embodiment includes moving the touch probe 118 so that probe end 1704 comes into contact with the platen or part to be indexed in the Z-direction. Once the probe end contacts the platen or part, a rough Z-position is known. The touch probe backs away from the platen or part, and at a slower speed, and knowing the rough location of the platen or part, refines the Z-position by once again moving into contact with the part or platen. This coarse-fine indexing allows for a more accurate Z-position determination.

In another embodiment, X-Y indexing of the system is also performed with the touch probe 118. Each touch probe 118 has its own configuration of the tip end (e.g., tip end 1704). An imaging device, such as a camera, is used to capture an image of the tip end along a longitudinal axis of the touch probe 118. The tip center is located in the image, and the X-Y positioning of the touch probe is enhanced. For each new tool that is loaded with the tool changer, a new image of the tip end is taken, as tips have different centers and configurations.

In one embodiment, the plunger portion 1701 of touch probe 118 that extends into a heated chamber (such as chamber 104) is constructed at least in part from a material or materials that have a low coefficient of thermal expansion, to further control to a temperature for the components of plunger 1701 which further limits thermal expansion thereof in a heated work environment, as described above. In one embodiment, a low coefficient of thermal expansion material includes ceramic.

Although the present disclosure has been described with reference to preferred embodiments, workers skilled in the art will recognize that changes may be made in form and detail without departing from the spirit and scope of the disclosure.

The invention claimed is:

1. A layerwise method for printing a three-dimensional item with an additive manufacturing system, the method comprising:
   printing a first plurality of layers of the three-dimensional item by depositing material from a print head onto a print foundation of the additive manufacturing system by incrementing a position of the print head tip in a first direction along a printing axis and relative to the print foundation after each layer of the first plurality of layers is printed;
   indexing the print foundation carrying the printed layers in a second direction along the print axis, wherein the second direction is opposite the first direction, and away from the print head a distance of a second plurality of layers along the printing axis after the first plurality of layers are printed, using a drive mechanism;
   moving the print head in the second direction, such that the print head tip is proximate a last printed layer;
   printing a second plurality of layers onto the first plurality of layers by incrementing the position of the print head tip in the first direction along a printing axis and relative to the print foundation after each layer of the second plurality of layers is printed; and
   repeating printing, incrementing, indexing and moving steps to build the three-dimensional item.

2. The method of claim 1, wherein the drive mechanism comprises a rail system comprising a plurality of driven rails and a plurality of fixed rails, and wherein indexing the print foundation along the printing axis comprises moving the driven rails with respect to the fixed rails while engaging the driven rails with the print foundation.

3. The method of claim 1, wherein the printing axis is a horizontal axis.

4. The method of claim 2, wherein moving the driven rails with respect to the fixed rails further comprises:
   disengaging clamps within fixed rails of the system;
   engaging clamps within driven rails of the system;
   moving the driven rails from a first position to a second position with a torque cylinder and torque tube, the torque tube coupled to the driven rails;
   engaging the clamps within the fixed rails;
   disengaging the clamps within the driven rails; and
   moving the driven rails from the second position to the first position with the torque cylinder and the torque tube.

5. The method of claim 4, and further comprising printing a plurality of layers of a support structure for the three-dimensional item onto the print foundation.

6. The method of claim 4, and further comprising probing the printed layers of the three-dimensional item and/or the support structure after performing the indexing step, to verify accurate positioning of the print head relative to the printed layers prior to printing additional layers.

7. The method of claim 2, wherein the drive mechanism further comprises a plurality of support rails, and wherein printing comprises printing a three-dimensional item having a length greater than a length of the support rails.

8. The method of claim 4, wherein engaging the clamps comprises engaging with the drive rails a starter piece affixed to the print foundation.

9. The method of claim 8, wherein disengaging the clamps comprises disengaging the drive rails from the starter piece.

10. The method of claim 3, and further comprising purging the print head at a purging location.

11. The method of claim 10, wherein purging comprises discharging waste material from the print head substantially horizontally and removing purged waste material from the purging location to a waste location using a vacuum to collect and transport material discharged from the print head.

12. A method for printing a three-dimensional structure comprising one or more parts and one or more support structures with an extrusion-based additive manufacturing system, the method comprising:
- printing one or more layers of the three-dimensional structure by extruding material from a print head onto a print foundation of the additive manufacturing system;
- incrementing a position of the print head tip in a first direction along a print axis and relative to the print foundation after each successive layer is printed until a first plurality of layers is printed;
- indexing the print foundation carrying the printed layers in a second direction along the print axis, the second direction being opposite the first direction, and away from the print head a distance of a second plurality of layers after the first plurality of layers are printed, using a drive mechanism;
- determining a location of a last printed layer of the first selected plurality of layers;
- moving the print head along the printing axis in the second direction based upon the determined location of the last printed layer such that the print head tip is positioned to print a next layer onto the last printed layer;
- printing the next plurality of layers by incrementing the position of the print head tip along a print axis in the first direction and relative to the print foundation after each successive layer is printed until the second plurality of layers is printed; and
- repeating incrementing, determining, indexing, moving and printing steps to build the three-dimensional item.

13. The method of claim 12, wherein the drive mechanism comprises a rail system comprising a plurality of driven rails and a plurality of fixed rails, and wherein indexing the print foundation along the printing axis comprises moving the driven rails with respect to the fixed rails while engaging the driven rails with the print foundation.

14. The method of claim 12, wherein the printing axis is a substantially horizontal axis.

15. The method of claim 13, wherein moving the driven rails with respect to the fixed rails further comprises:
- disengaging clamps within fixed rails of the system;
- engaging clamps within driven rails of the system;
- moving the driven rails from a first position to a second position with a torque cylinder and torque tube, the torque tube coupled to the driven rails;
- engaging the clamps within the fixed rails;
- disengaging the clamps within the driven rails; and
- moving the driven rails from the second position to the first position with the torque cylinder and the torque tube.

16. The method of claim 12, and wherein determining the position of the last printed layer comprises probing the printed layers of the three-dimensional structure in the X, Y and Z directions.

17. The method of claim 13, wherein the drive mechanism further comprises a plurality of support rails, and wherein printing comprises printing the three-dimensional structure having a length greater than a length of the support rails.

18. The method of claim 15, wherein engaging the clamps comprises engaging with the drive rails a starter piece affixed to the print foundation.

19. The method of claim 18, wherein disengaging the clamps comprises disengaging the drive rails from the starter piece.

20. The method of claim 12, and further comprising purging the print head at a purging location.

* * * * *